US010278002B2

United States Patent
Gamper et al.

(10) Patent No.: US 10,278,002 B2
(45) Date of Patent: Apr. 30, 2019

(54) SYSTEMS AND METHODS FOR NON-PARAMETRIC PROCESSING OF HEAD GEOMETRY FOR HRTF PERSONALIZATION

(71) Applicant: Microsoft Technology Licensing, LLC, Redmond, WA (US)

(72) Inventors: Hannes Gamper, Cambridge (GB); David Johnston, Bellevue, WA (US); Ivan Tashev, Kirkland, WA (US); Archontis Politis, Helsinki (FI); Mark R. P. Thomas, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/463,853

(22) Filed: Mar. 20, 2017

(65) Prior Publication Data

US 2018/0270603 A1 Sep. 20, 2018

(51) Int. Cl.
*H04S 7/00* (2006.01)
*G06T 19/20* (2011.01)
*H04R 5/033* (2006.01)

(52) U.S. Cl.
CPC ............ *H04S 7/304* (2013.01); *G06T 19/20* (2013.01); *H04R 5/033* (2013.01); *H04S 2400/11* (2013.01); *H04S 2420/01* (2013.01)

(58) Field of Classification Search
CPC ..... G10L 19/008; G10L 19/032; G10L 19/26; H04S 2420/01; H04S 2420/03
USPC .............................. 381/17, 22, 309; 704/500
See application file for complete search history.

(56) References Cited

U.S. PATENT DOCUMENTS

| 4,325,381 A | 4/1982 | Glenn |
| 6,996,244 B1 | 2/2006 | Slaney et al. |
| 7,234,812 B2 | 6/2007 | Piorkowski et al. |
| 8,014,532 B2 * | 9/2011 | Bruno ..................... H04S 1/002 381/17 |
| 8,270,616 B2 | 9/2012 | Slamka et al. |
| 8,767,968 B2 | 7/2014 | Flaks et al. |
| 8,787,584 B2 | 7/2014 | Nystrom et al. |
| 9,236,024 B2 | 1/2016 | Coon |

(Continued)

FOREIGN PATENT DOCUMENTS

| EP | 2611216 | 7/2013 |
| WO | WO 2013111038 | 8/2013 |

OTHER PUBLICATIONS

Bilinski, et al., "HRTF Magnitude Synthesis Via Sparse Representation of Anthropometric Features", In Proceedings of IEEE International Conference on Acoustics, Speech and Signal Processing, May 4, 2014, 5 pages.

(Continued)

*Primary Examiner* — Alexander Jamal

(57) ABSTRACT

Systems and methods for HRTF personalization are provided. More specifically, the systems and methods provide HRTF personalization utilizing non-parametric processing of three-dimensional head scans. Accordingly, the systems and methods for HRTF personalization generate a personalized set of HRTFs for a user without having to extract specific geometric and/or anthropometric features from a three dimensional head scan of a user and/or from the three dimensional head scans of training subjects in a database.

20 Claims, 12 Drawing Sheets
(2 of 12 Drawing Sheet(s) Filed in Color)

(56) References Cited

U.S. PATENT DOCUMENTS

| | | | |
|---|---|---|---|
| 9,544,706 B1 | 1/2017 | Hirst | |
| 9,615,190 B1* | 4/2017 | Norris | H04S 7/304 |
| 9,900,722 B2 | 2/2018 | Bilinski et al. | |
| 9,934,590 B1* | 4/2018 | Cheng | G06T 7/606 |
| 10,028,070 B1 | 7/2018 | Gamper et al. | |
| 2003/0138107 A1 | 7/2003 | Jin et al. | |
| 2007/0183603 A1 | 8/2007 | Jin et al. | |
| 2009/0046864 A1 | 2/2009 | Mahabub et al. | |
| 2009/0238371 A1 | 9/2009 | Rumsey et al. | |
| 2010/0111370 A1 | 5/2010 | Black et al. | |
| 2012/0183161 A1 | 7/2012 | Agevik et al. | |
| 2012/0237041 A1 | 9/2012 | Pohle | |
| 2012/0328107 A1 | 12/2012 | Nystrom et al. | |
| 2013/0046790 A1 | 2/2013 | Katz et al. | |
| 2013/0169779 A1 | 7/2013 | Pedersen | |
| 2013/0194107 A1 | 8/2013 | Nagata | |
| 2014/0355765 A1* | 12/2014 | Kulavik | H04S 7/302 381/17 |
| 2015/0055937 A1 | 2/2015 | Van hoff et al. | |
| 2015/0156599 A1 | 6/2015 | Romigh | |
| 2015/0257682 A1* | 9/2015 | Hansen | A61B 5/1128 382/103 |
| 2015/0312694 A1 | 10/2015 | Bilinski et al. | |
| 2016/0253675 A1* | 9/2016 | Remillet | G06F 21/31 705/44 |
| 2017/0208413 A1 | 7/2017 | Bilinski et al. | |
| 2017/0332186 A1* | 11/2017 | Riggs | H04S 7/301 |
| 2018/0146318 A1 | 5/2018 | Bilinski et al. | |

OTHER PUBLICATIONS

"Making immersive virtual reality possible in mobile", In White Paper of Qualcomm, Apr. 2016, pp. 1-51.

Wahab, et al., "The Effectiveness of Chosen Partial Anthropometric Measurements in Individualizing Head-Related Transfer Functions on Median Plane", In ITB Journal of Information and Communication Technology, vol. 5, Issue 1, May 2011, pp. 35-56.

Sunder, et al., "Individualization of Head-Related Transfer Functions in the Median Plane using Frontal Projection Headphones", In Journal of Audio Engineering Society, vol. 64, No. 12, Dec. 27, 2016, 1 pages.

Hertsens, Tyll, "AES Headphone Technology Conference: Head Related Transfer Function", In Audio Engineering Society Headphone Conference, Sep. 1, 2016, 11 pages.

Fink, et al., "Tuning principal component weights to individualize HRTFs", In Proceedings of IEEE International Conference on Acoustics, Speech and Signal Processing, Mar. 25, 2012, pp. 389-392.

Harma, et al., "Personalization of headphone spatialization based on the relative localization error in an auditory gaming interface", In AES 132nd Convention, Apr. 26, 2012, 9 pages.

McMullen, et al., "Subjective selection of HRTFs based on spectral coloration and interaural time difference cues", In Proceedings of AES 132rd Convention, Oct. 26, 2012, pp. 1-9.

Huttunen, et al., "Rapid generation of personalized HRTFs", In Proceedings of Audio Engineering Society Conference: 55th International Conference on Spatial Audio, Aug. 26, 2014, 6 pages.

Mokhtari, et al., "Computer simulation of HRTFs for personalization of 3D audio", In Proceedings of Second International Symposium on Universal Communication, Dec. 15, 2008, pp. 435-440.

Meshram, et al., "Efficient HRTF Computation using Adaptive Rectangular Decomposition", In Proceedings of Audio Engineering Society Conference: 55th International Conference on Spatial Audio, Aug. 27, 2014, 9 pages.

Jin, et al., "Enabling individualized virtual auditory space using morphological measurements", In Proceedings of the First IEEE Pacific-Rim Conference on Multimedia, Dec. 2000, 4 pages.

Zotkin, et al., "HRTF personalization using anthropometric measurements", In Proceedings of IEEE Workshop on Applications of Signal Processing to Audio and Acoustics, Oct. 19, 2003, 4 pages.

Hu, et al., "HRTF personalization based on multiple regression analysis", In Proceedings of International Conference on Computational Intelligence and Security, vol. 2, Nov. 3, 2006, pp. 1829-1832.

Guillon, et al., "HRTF customization by frequency scaling and rotation shift based on a new morphological matching method", In Proceedings of 125th Convention of the AES, Oct. 1, 2008, 14 pages.

Zeng, et al., "A hybrid algorithm for selecting HRTF based on similarity of anthropometric structures", In Journal of Sound and Vibration, vol. 329, Issue 19, Sep. 13, 2010.

Schonstein, et al., "HRTF selection for binaural synthesis from a database using morphological parameters", In Proceedings of 20th International Congress on Acoustics, Aug. 23, 2010, pp. 1-6.

Bilinski, et al., "HRTF magnitude synthesis via sparse representation of anthropometric features", In Proceedings of IEEE International Conference on Acoustics, Speech and Signal Processing, May 4, 2014, 6 pages.

Gamper, et al., "Anthropometric parameterisation of a spherical scatterer ITD model with arbitrary ear angles", In Proceedings of IEEE Workshop on Applications of Signal Processing to Audio and Acoustics, Oct. 18, 2015, 5 pages.

Xu, et al., "Individualization of HRTF for 3D virtual auditory display: a review", In Proceedings of International Conference on Virtual Reality, Jul. 22, 2007, pp. 397-407.

Kazhdan, et al., "Rotation invariant spherical harmonic representation of 3D shape descriptors", In Journal of Eurographics Symposium on Geometry Processing, vol. 6, Jun. 23, 2003, pp. 156-165.

Funkhouser, et al., "A search engine for 3D models", In Journal ACM Transactions on Graphics, vol. 22, Issue 1, Jan. 2003, pp. 83-105.

Erturk, et al., "Efficient representation of 3D human head models", In Proceedings of the British Machine Vision Conference, Sep. 13, 1999, pp. 329-339.

Wang, et al., "Rotational invariance based on Fourier analysis in polar and spherical coordinates", In Journal of IEEE transactions on pattern analysis and machine intelligence, vol. 31, Issue 9, Sep. 2009, pp. 1715-1722.

Pei, et al., "Discrete spherical harmonic oscillator transforms on the cartesian grids using transformation coefficients", In Journal of IEEE Transactions on Signal Processing, vol. 61, Issue 5, Mar. 1, 2013, pp. 1149-1164.

Pei, et al., "3D rotation estimation using discrete spherical harmonic oscillator transforms", In Proceedings of IEEE International Conference on Acoustics, Speech and Signal Processing, May 5, 2014, 20 pages.

Abramowitz, et al., "Handbook of mathematical functions, Courier Corporation", In Publication of Courier Corporation, Jun. 1994, 22 pages.

Fliege, et al., "The distribution of points on the sphere and corresponding cubature formulae", In Journal of IMA Numerical Analysis, vol. 19, Issue 2, Apr. 1, 1999.

Xu, et al., "Individualization of Head-Related Transfer Function for Three-Dimensional Virtual Auditory Display: A Review", In Proceedings of International Conference on Virtual Reality, Jul. 22, 2007, pp. 397-407.

Haneda, et al., "Common-acoustical-pole and zero modeling of head-related transfer functions", In IEEE transactions on speech and audio processing, vol. 7, Issue 2, Mar. 1999, pp. 188-196.

Algazi, et al., "Approximating the head-related transfer function using simple geometric models of the head and torso", In Journal of the Acoustical Society of America, vol. 112, Issue 5, Aug. 1, 2002, pp. 2053-2064.

Zotkin, et al., "HRTF personalization using anthropometric measurements", In Proceedings of IEEE Workshop on Applications of Signal Processing to Audio and Acoustics, Oct. 19, 2003, pp. 1-4.

Jin, et al., "Creating the Sydney York morphological and acoustic recordings of ears database", In Proceedings IEEE Transactions on Multimedia, vol. 16, Issue 1, Jan. 2014, pp. 37-46.

Grijalva, et al., "Anthropometric-based customization of head-related transfer functions using Isomap in the horizontal plane", In Proceedings of IEEE International Conference on Acoustic, Speech and Signal Processing, May 4, 2014, 5 pages.

(56) References Cited

OTHER PUBLICATIONS

Tashev, Ivan, "HRTF phase synthesis via sparse representation of anthropometric features", In Proceedings of Information Theory and Applications, Feb. 9, 2014, 5 pages.
Wightman, et al., "Factors affecting the relative salience of sound localization cues", In Publication of Psychology Press, 1997.
Algazi, et al., "Estimation of a spherical-head model from anthropometry", In Journal of the Audio Engineering Society, vol. 49, No. 6, Jun. 2001, pp. 1-21.
Kuhn, George F., "Model for the interaural time differences in the azimuthal plane", In the Journal of the Acoustical Society of America, vol. 62, No. 1, Jul. 1977, pp. 157-167.
Aaronson, et al., "Testing, correcting, and extending the Woodworth model for interaural time difference", In the Journal of the Acoustical Society of America, vol. 135, No. 2, Feb. 2014, pp. 817-823.
Duda, et al., "An adaptable ellipsoidal head model for the interaural time difference", In Proceedings of IEEE International Conference on Acoustics, Speech, and Signal Processing, Mar. 15, 1999, pp. 1-4.
Gamper, et al., "Estimation of multipath propagation delays and interaural time differences from 3-D head scans", In Proceedings of IEEE International Conference on Acoustics, Speech and Signal Processing, Apr. 19, 2015, pp. 499-503.
Zolfaghari, et al., "Large deformation diffeomorphic metric mapping and fast-multipole boundary element method provide new insights for binaural acoustics", In Proceedings of IEEE International Conference on Acoustics, Speech and Signal Processing, May 4-9, 2014, pp. 1-5.
Zotkin, et al., "Rendering localized spatial audio in a virtual auditory space", In Journal of IEEE Transactions on Multimedia, vol. 6, Issue 4, Aug. 2004, pp. 553-564.
Kulkarni, et al., "Sensitivity of human subjects to head-related transfer-function phase spectra", In Journal of Acoustical Society of America, vol. 105, Issue 5, May 1999, pp. 2821-2840.
Constana, et al., "On the detection of dispersion in the head-related transfer function", In Journal of Acoustical Society of America, vol. 114, Issue 2, Aug. 2003, pp. 998-1008.
Fliege, et al., "A two-stage approach for computing cubature formulae for the sphere", In Thesis of University of Dortmund, 1996, pp. 1-31.
Ahrens, et al., "HRTF magnitude modeling using a non-regularized least-squares fit of spherical harmonics coefficients on incomplete data", In Proceedings of Asia-Pacific Signal and Information Processing Association Annual Summit and Conference, Dec. 3, 2012, 5 pages.
Amberg, et al., "Optimal step nonrigid ICP algorithms for surface registration", In Proceedings of IEEE Conference on Computer Vision and Pattern Recognition, Jun. 17, 2007, 8 pages.
Satarzadeh, et al., "Physical and filter pinna models based on anthropometry", In Proceedings of Presented at the 122nd Convention of Audio Engineering Society, May 5, 2007, pp. 1-20.
He, et al., "On the preprocessing and postprocessing of HRTF individualization based on sparse representation of anthropometric features", In Proceedings of IEEE International Conference on Acoustic, Speech and Signal Processing, Apr. 19, 2015, 6 pages.
Lalwani, Mona, "3D audio is the secret to HoloLens' convincing holograms", published Feb. 11, 2016, 17 pgs.
U.S. Appl. No. 14/265,154, Notice of Allowance dated Sep. 5, 2017, 8 pgs.
"Non-negative matrix factorization." Retrieved from Wikipedia on Mar. 26, 2014 at: https://en/wikipedia.org/wiki/Nonnegative_matrix_factorization, 11 pages.
Algazi et al, "The CIPIC HRTF Database", Proceedings of IEEE Workshop on the Applications of Signal Processing to Audio and Acoustics, Oct. 2001, 4 pages.
Andreopoulou, Areti, "Head-Related Transfer Function Database Matching Based on Sparse Impulse Response Measurements",New York University, 2013, 239 pgs.
Bilinski, "HRTF Personalization using Anthropometric Features", retrieved on Jul. 3, 2014 at «http://research.microsofl.com/apps/video/defaultaspx?id=201707», Microsoft Corporation, 2013, 1 page.
Bosun et al., "Head-related transfer function database and its analyses", Proceedings of Science in China Series G: Physics, Mechanics & Astronomy, vol. 50, No. 3, Jun. 2007, 14 pages.
Donoho, "For Most Large Underdetermined Systems of Linear Equations of Minimal 11-Norm Solution is also the Sparsest Solution", Technical Report, Jul. 2004, 30 pages.
Grindlay et al., "A Multilenear Approach to HRF Personalization", Proceedings of 32nd International Conference on caustics, Speech, and Signal Processing, Apr. 2007, 4 pages.
Haraszy et al., "Improved Head Related Transfer Function Generation and Testing for Acoustic Virtual Reality Development" Proceedings of the 14th WSEAS International Conference on Systems: Part of the 14th WSEAS CSCC Multiconference, vol. 2, Jul. 2010, 6 pages.
Hastie,Trevor et al., "The Elements of Statistical Learning Data Mining, Inference, and Prediction", Springer New York, Sep. 15, 2009, pp. 139-189, 219-251, 485-579, and 649-694.
Hoerl et al., "Ridge regression Biased estimation for Nonorthogonal Problems" Journal of Technometrics, vol. 42, Issue 1, Feb. 2000, 7 pages.
Hu et al., "HRTF personalization based on artificial neural network in individual virtual auditory space", In the Proceedings of the Journal of Applied Acoustics, vol. 69, Iss. 2, Feb. 2009, pp. 163-172.
Huang et al., "Sparse Representation for Signal Classification", Proceedings of Twenty-First Annual Conference on Neural Information Processing Systems, Dec. 2007, 8 pages.
Kohavi, "A Study of Cross-Validation and Bootstrap for Accuracy Estimation and Model Selection", Proceedings of the 14th International Joint Conference on Artificial Intelligence, vol. 2, Aug. 1995, 7 pages.
Kukreja et al., "A Least Absolute Shrinkage and Selection Operator (Lasso) for Nonlinear System Identification", Proceedings NIA, Mar. 2014, 6 pages.
Lemaire, Vincent, et al., "Individualized HRTFs From Few Measurements: a Statistical Learning Approach", IEEE (2005), pp. 2041-2046.
Li et al., "HRTF Personalization Modeling Based on RBF Neural Network", Proceedings of International Conference on Acoustics, Speech and Signal Proceeding, May 2013, 4 pages.
Luo et al., "Gaussian Process Data Fusion for the Heterogeneous HRTF Datasets", Proceedings of IEEE Workshop on Applications of Signal Processing to Audio and Acoustics, Oct. 2013, 4 pages.
Mohan et al., "Using Computer Vision to Generate Customized Spatial Audio", Proceedings of the International Conference on Multimedia and Expo, vol. 3, Jul. 2003, 4 pages.
Huang, Qing-hua,and Yong Fang, "Modeling personalized head-related impulse response using support vector regression", J. Shanghai Univ, 2009, pp. 428-432.
Rothbucher et al., "Measuring Anthropometric Data for HRTF Personalization" Sixth International Conference on Signal-Image Technology and Internet Based Systems, Dec. 2010, 5 pages.
Spagnol et al., "On the Relation Between Pinna Reflection Patterns and Head-Related Transfer Function Features", Proceedings of IEEE Transactions on Audio, Speech, and Language Processing, vol. 21, Issue 3, Mar. 2013, 12 pages.
Tashev, Ivan, "Audio challenges in virtual and augmented reality devices", In Proceedings of IEEE International Workshop on Acoustic Signal Enhancement, Sep. 15, 2016, pp. 1-44.
U.S. Appl. No. 14/265,154, Amendment and Response filed Dec. 9, 2016, 32 pgs.
U.S. Appl. No. 14/265,154, Amendment and Response filed Apr. 12, 2016, 29 pgs.
U.S. Appl. No. 14/265,154, Office Action dated Feb. 1, 2016, 22 pgs.
U.S. Appl. No. 14/265,154, Office Action dated Apr. 7, 2017, 19 pgs.
U.S. Appl. No. 14/265,154, Office Action dated Sep. 9, 2016, 18 pgs.
Wagner et al., "Towards a Practical Face Recognition System: Robust Alignment and Illumination by Sparse Representation"

(56) References Cited

OTHER PUBLICATIONS

Proceedings of IEEE Transactions on Pattern Analysis and Machine Intelligence, vol. 34, Issue 2, Feb. 2012, 15 pages.
Wahab et al., "Improved Method for Individualization of Head-Related Transfer Functions on Horizontal Plane Using Reduced Number of Anthropometric Measurements", Journal of Telecommunications, vol. 2, Issue 2, May 2010, 11 pages.
Wright et al., "Robust Face Recognition via Sparse Representation", IEEE Transactions on Pattern Analysis and Machine Intelligence, vol. 31, No. 2, Feb. 2009, 18 pages.
Zollofer, et al., "Automatic Reconstruction of Personalized Avatars from 3D Face Scans", In Journal of Computer Animation and Virtual Worlds, vol. 22 Issue 2-3, Apr. 2011, 8 pages.
Zotkin, et al., "Virtual audio system customization using visual matching of ear parameters", In Proceedings 16th International Conference on Pattern Recognition, Aug. 11, 2002, pp. 1003-1006.
U.S. Appl. No. 14/265,154, Amendment and Response filed Jul. 7, 2017, 15 pgs.
U.S. Appl. No. 14/265,154, Notice of Allowance dated Jan. 23, 2018, 2 pgs.
U.S. Appl. No. 15/473,959, Office Action dated Feb. 27, 2018, 6 pages.
"HRTF personalization based on artificial neural network in individual virtual auditory space." Science direct, located at: www.sciencedirect.com/science/article/pii/S000368X07000965, 2 pages.
Gilkey, Robert H., "Binaural and spatial hearing in real and virtual environments", Mahwah, NJ, Lawrence Erlbaum Associates,1997, pp. 1-23.
U.S. Appl. No. 15/627,849, Notice of Allowance dated Mar. 19, 2018, 11 pages.
"AES Standard for File Exchange-Spatial Acoustic Data File Format", Published by Audio Engineering Society Inc., Jan. 2015, 5 Pages.
"Acoustics-Normal Equal-Loudness-Level Contours", Published by International Standard, Reference No. ISO226:2003(E), Aug. 15, 2003, 7 Pages.
"Kinect for Xbox 360", Retrieved from: <<https://web.archive.org/web/20141216195730/http://www.xbox.com/en-US/xbox-360/accessories/kinect>>, Jul. 9, 2018, 1 Page.
"SOFA General Purpose Database", Retrieved from: <<https://web.archive.org/web/20170617145713/https://www.sofaconventions.org/mediawiki/index.php/Files>>, Oct. 25, 2017, 2 Pages.
Algazi, et al., "Elevation Localization and Head-Related Transfer Function Analysis at Low Frequencies", In Journal of the Acoustical Society of America, vol. 109, Issue 3, Mar. 2001, 14 Pages.
Bach, et al., "On Pixel-Wise Explanations for Non-Linear Classifier Decisions by Layer-Wise Relevance Propagation", In Journal of Plos One, vol. 10, Issue 7, Jul. 10, 2015, 46 Pages.
Blauert, Jens, "Spatial Hearing: The Psychophysics of Human Sound Localization", In Journal of the Acoustical Society of America, vol. 77, Issue 334, Jan. 1985, pp. 334-335.
Bloom, Jeffrey P., "Creating Source Elevation Illusions by Spectral Manipulation", In Journal of Audio Engineering Society, vol. 25, Issue 9, Sep. 1, 1977, pp. 560-565.
Bomhardt, et al., "A High Resolution Head-Related Transfer Function and Three-Dimensional Ear Model Database", In Proceedings of 172 Meetings of Acoustical Society of America, vol. 29, Nov. 28, 2016, 12 Pages.
Chakrabarty, et al., "Broadband DOA Estimation using Convolutional Neural Networks Trained with Noise Signals", In Proceedings of IEEE Workshop on Applications of Signal Processing to Audio and Acoustics, Oct. 15, 2017, 5 Pages.
Gardner, Mark B., "Some Monaural and Binaural Facets of Median Plane Localization", In Journal of the Acoustical Society of America, vol. 54, Issue 6, Dec. 1973, 8 Pages.
Guldenschuh, et al., "HRTF Modeling in Due Consideration Variable Torso Reflections", In Journal of the Acoustical Society of America, vol. 123, Issue 5, May 2008, 6 Pages.

Hebrank, et al., "Spectral Cues used in the Localization of Sound Sources on the Median Plane", In Journal of the Acoustic Society of America, vol. 56, Issue 6, Dec. 1974, 7 Pages.
Jin, et al., "Contrasting Monaural and Interaural Spectral Cues for Human Sound Localization", In Journal of the Acoustical Society of America, vol. 115, Issue 6, Jun. 2004, 4 Pages.
Jin, et al., "Neural System Identification Model of Human Sound Localization", In Journal of the Acoustical Society of America, vol. 108, Issue 3, Sep. 2000, 22 Pages.
Kulkarni, et al., "Role of Spectral Detail In Sound-Source Localization", In Journal of Nature, vol. 396, Dec. 24, 1998, pp. 747-749.
Lapuschkin, et al., "The LRP Toolbox for Artificial Neural Networks", In Journal of Machine Learning Research, vol. 17, Issue 1, Jan. 1, 2016, 5 Pages.
Majdak, et al., "3-D Localization of Virtual Sound Sources: Effects of Visual Environment, Pointing Method, and Training", In Journal of Attention, Perception, and Psychophysics, vol. 72, Issue 2, Feb. 1, 2010, pp. 454-469.
Middlebrooks, John C., "Virtual Localization Improved by Scaling Nonindividualized External-Ear Transfer Functions in Frequency", In Journal of the Acoustical Society of America, vol. 106, Issue 3, Sep. 1999, 19 Pages.
Montavon, et al., "Explaining Nonlinear Classification Decisions with Deep Taylor Decomposition", In Journal of Pattern Recognition, vol. 65, May 2017, pp. 211-222.
Montavon, et al., "Methods for Interpreting and Understanding Deep Neural Networks", Retrieved from; <<https://arxiv.org/pdf/1706.07979.pdf>>, Jun. 24, 2017, 14 Pages.
Politis, et al., "Applications of 3D Spherical Transforms to Personalization of Head-Related Transfer Functions", In Proceedings of IEEE International Conference on Acoustics, Speech and Signal Process, Mar. 2016, pp. 306-310.
Raykar, et al., "Extracting the Frequencies of the Pinna Spectral Notches in Measured Head Related Impulse Responses", In Journal of the Acoustical Society of America, vol. 118, Issue 1, Jul. 2005, 12 Pages.
Searle, et al., "Model for Auditory Localization", In Journal of the Acoustical Society of America, vol. 60, No. 5, Nov. 1976, 13 Pages.
Shaw, et al., "Sound Pressure Generated in an External-Ear Replica and Real Human Ears by a Nearby Point Source", In Journal of the Acoustical Society of America, vol. 44, Issue 1, Jul. 1968, 11 Pages.
Sridhar, et al., "A Method for Efficiently Calculating Head-Related Transfer Functions Directly from Head Scan Point Clouds", In Proceedings of 143rd Convention of Audio Engineering Society, Oct. 18, 2017, 9 Pages.
Thuillier, et al., "Spatial Audio Feature Discovery with Convolutional Neural Networks", In Proceedings of IEEE International Conference on Acoustics, Speech and Signal Processing, Apr. 20, 2018, 5 Pages.
Watanabe, et al., "Dataset of Head-Related Transfer Functions Measured with a Circular Loudspeaker Array", In Journal of the Acoustical Science and Technology, vol. 35, Issue 3, Mar. 1, 2014, pp. 159-165.
Wenzel, et al., "Localization Using Nonindividualized Head-Related Transfer Functions", In Journal of the Acoustical Society of America vol. 94, Issue 1, Jul. 1993, 14 Pages.
Wightman, et al., "Headphone Simulation of Free-Field Listening. II: Psychophysical Validation", In Journal of the Acoustical Society of America, vol. 85, Issue 2, Feb. 1989, pp. 868-878.
Woodworth, et al., "Experimental Psychology", Retrieved from: <<https://ia601901.us.archive.org/30/items/ExperimentalPsychology/Experimental%20Psychology.pdf>>, Jan. 1, 1954, 958 Pages.
Oord, et al., "Wavenet: A Generative Model for Raw Audio", Retrieved from: <<https://arxiv.org/pdf/1609.03499.pdf>>, Sep. 19, 2016, 15 Pages.
U.S. Appl. No. 15/473,959, Notice of Allowance dated Aug. 14, 2018, 9 pages.
"Non Final Office Action Issued in U.S. Appl. No. 15/876,644", dated Sep. 17, 2018, 13 Pages.
"Notice of Allowance Issued in U.S. Appl. No. 15/876,644", dated Jan. 17, 2019, 8 Pages.

* cited by examiner

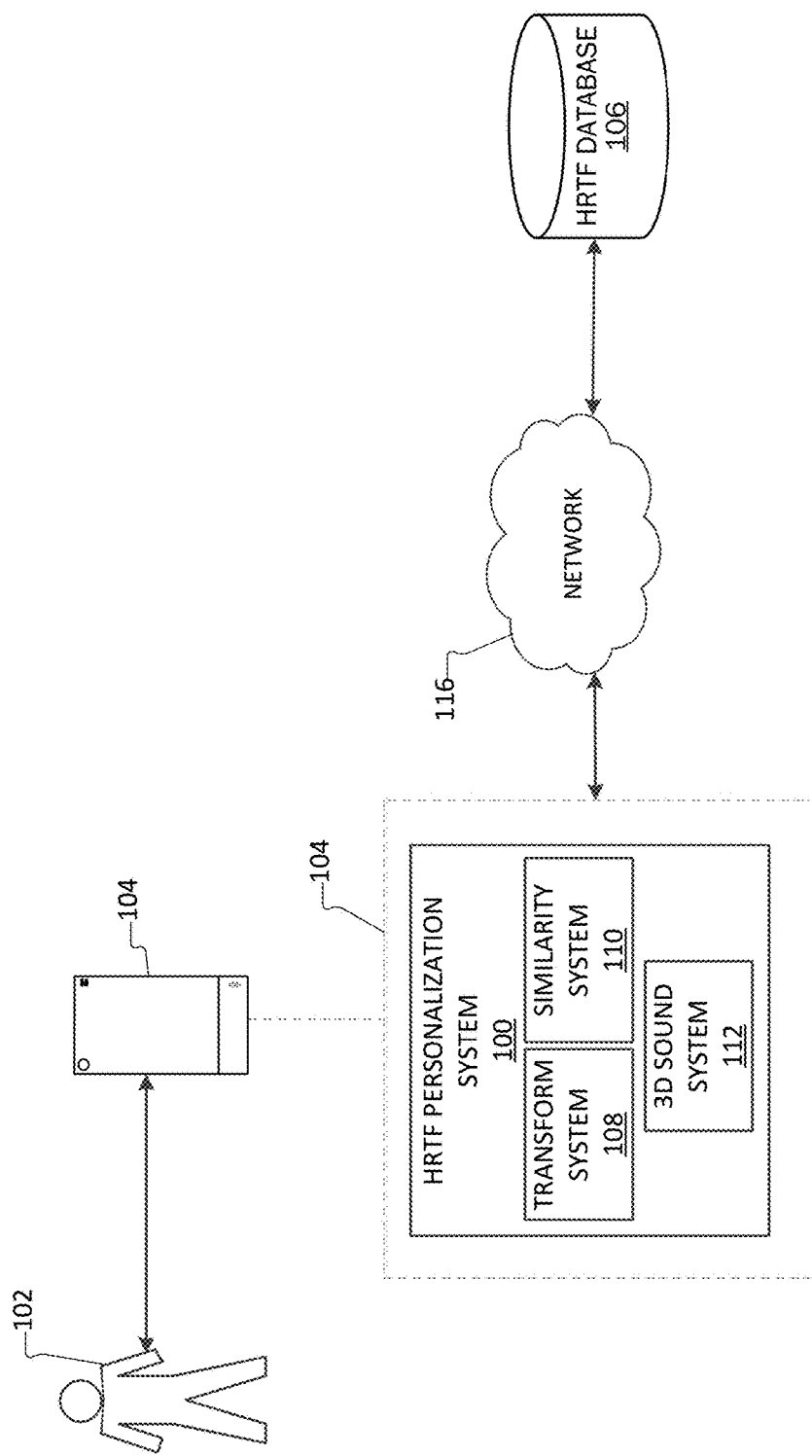

Mobile Computing Device

SYSTEMS AND METHODS FOR NON-PARAMETRIC PROCESSING OF HEAD GEOMETRY FOR HRTF PERSONALIZATION

BACKGROUND

Head-related transfer functions (HRTFs) are acoustic transfer functions that describe the transfer of sound from a sound source position to the entrance of the ear canal of a human subject. HRTFs may be used to process a non-spatial audio signal to generate a HRTF-modified audio signal. The HRTF-modified audio signal may be played back over a pair of headphones or speakers that are placed over or near the ears of the human subject to simulate sounds as coming from various arbitrary locations with respect to the ears of the human subject. Accordingly, HRTFs may be used for a variety of applications, such as 3-dimensional (3D) audio for games, live streaming of audio for events, music performances, audio for virtual reality, and/or other forms of audiovisual-based entertainment.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for HRTF personalization. More specifically, the systems and methods disclosed herein utilize non-parametric processing of the head shape and/or portion of the head shape of a given user to identify a training subject that has the most similar head shape and/or portion of the head shape to that of the given user based on a database of training subjects with mapped sets of HRTFs. As such, the systems and methods as disclosed herein compare harmonic expansions of head scans for HRTF personalization unlike previously utilized HRTF personalization systems and methods that utilized three-dimensional head scans.

One aspect of the disclosure is directed to a system for head-related transfer function (HRTF) personalization. The system includes at least one processor and a memory. The memory encodes computer executable instruction that, when executed by the at least one processor, are operative to:
apply a three-dimensional transform to a three-dimensional scan of a head of a user to form a user transform;
compare the user transform to a set of training subject transforms;
identify a closest transform of a closest training subject from the set of training subject transforms that is most similar to the user transform based on the comparison of the user transform to the set of training subject transforms;
in response to identifying the closest transform, utilizing one or more interaural time delays of the closest training subject to generate a personalized set of HRTFs for the user; and
generate an HRTF-modified audio signal based on the personalized set of HRTFs for the user.

In another aspect, method for head-related transfer function (HRTF) personalization is disclosed. The method includes:
collecting a three-dimensional scan of a head of a user;
applying a three-dimensional transform to the three-dimensional scan of the head of the user to form a user transform;
comparing the user transform to a set of training subject transforms;
identifying a closest transform of a closest training subject from the set of training subject transforms that is most similar to the user transform based on the comparing;
in response to the identifying of the closest transform, utilizing HRTF magnitudes or interaural time delays of the closest training subject as a personalized set of HRTFs for the user; and
generating an HRTF-modified audio signal based on the personalized set of HRTFs for the user.

In yet another aspect of the invention, a system for head-related transfer function (HRTF) personalization is disclosed. The system includes at least one processor and a memory. The memory encodes computer executable instruction that, when executed by the at least one processor, are operative to:
apply a three-dimensional transform to a three-dimensional scan of a head of a user to form a user transform;
identify a closest transform of a training subject from a set of training subject transforms that is most similar to the user transform; and
in response to identifying the closest transform, utilizing a set of HRTFs of the training subject as a personalized set of HRTFs for the user.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The patent or application contains at least one drawing executed in color. Copies of this patent or patent application publication with color drawing(s) will be provided by the Office upon request and payment of the necessary fee. Non-limiting and non-exhaustive aspects are described with reference to the following Figures.

FIG. 1A is a schematic diagram illustrating a system for HRTF personalization being utilized by a user via a client computing device, in accordance with aspects of the disclosure.

DETAILED DESCRIPTION

Figure 1B:
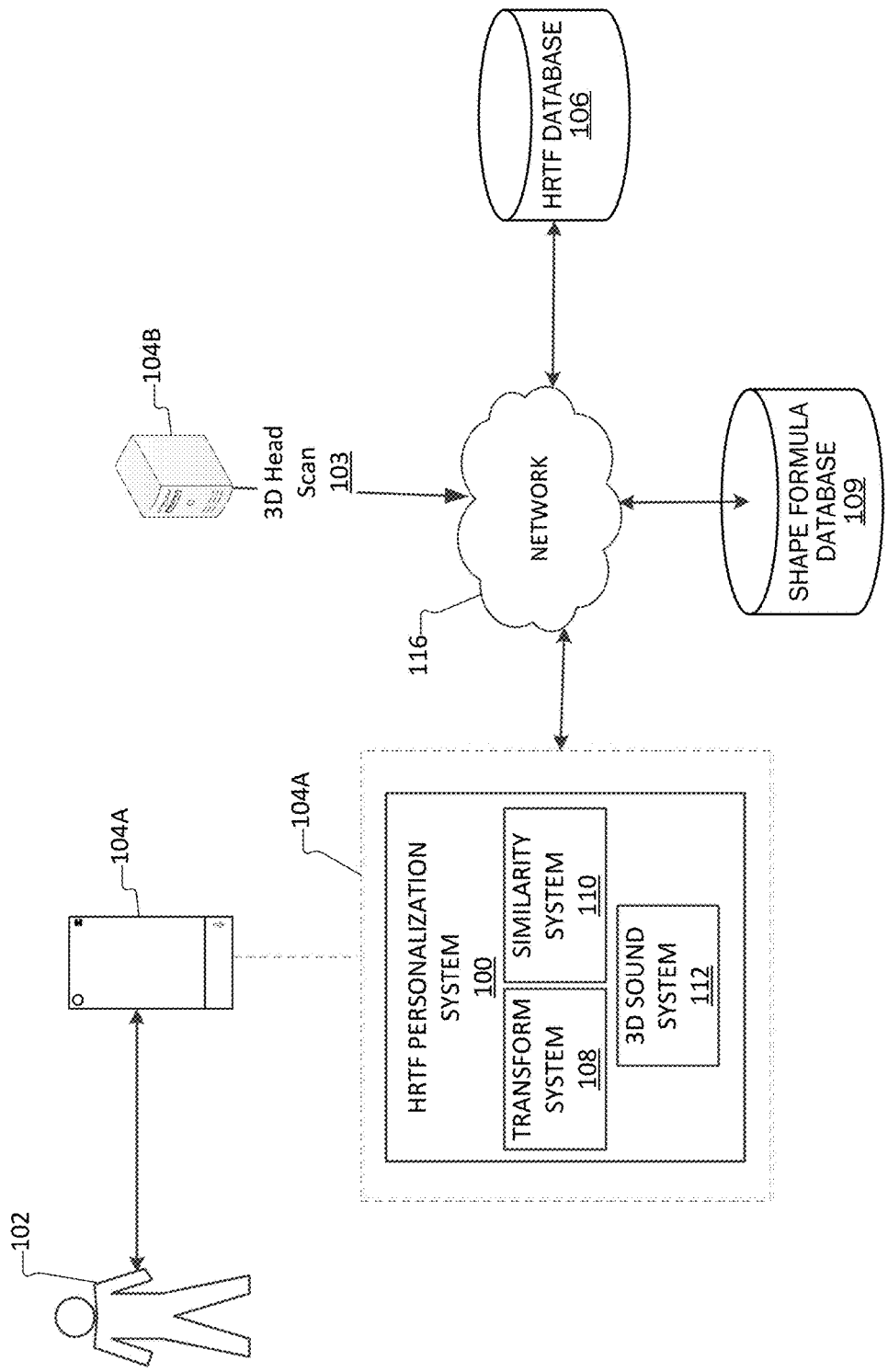
FIG. 1B is a schematic diagram illustrating a system for HRTF personalization being utilized by a user via a client computing device, in accordance with aspects of the disclosure.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

As discussed above, HRTFs may be used to process a non-spatial audio signal to generate a HRTF-modified audio signal. The HRTF-modified audio signal may be played back over one or more speakers, such as a pair of headphones that are placed over the ears of the human subject, to simulate sounds as coming from various arbitrary locations with respect to the ears of the human subject. Accordingly, HRTFs may be used for a variety of applications, such as 3-dimensional (3D) audio for games, live streaming of audio for events, music performances, audio for virtual reality, and/or other forms of audiovisual-based entertainment.

However, due to anthropometric variability in human subjects, each human subject is likely to have a unique set of HRTFs. For example, the set of HRTFs for a human subject may be affected by anthropometric features such as the circumference of the head, the distance between the ears, neck length, etc., of the human subject. Accordingly, the HRTFs for a human subject are generally measured under anechoic conditions using specialized acoustic measuring equipment, such that the complex interactions between direction, elevation, distance and frequency with respect to the sound source and the ears of the human subject may be captured in the functions. Such measurements may be time consuming to perform. Further, the use of specialized acoustic measuring equipment under anechoic conditions means that the measurement of personalized HRTFs for a large number of human subjects may be difficult, expensive and/or impractical.

An important cue encoded in the HRTF is the interaural time difference (ITD), which is the difference in times of arrival of a sound at both ears. The ITD is a function of the sound's direction of arrival as well as the listener's anthropometry. The human auditory system relies on the ITD as a major localization cue. Precise ITD modelling is important to accurate spatial rendering. Commonly utilized geometric ITD models include the Woodworth model and the spherical scatterer model. Both models approximate the head as a rigid sphere. These models have been extended to arbitrary ear angles and ellipsoidal head shapes.

Previously utilized systems and methods have tried to identify indirect methods for personalizing HRTFs for various different users. In the previously utilized systems and methods, a high resolution three-dimensional (3D) head scan of a user was obtained and one or more specific or discrete anthropomorphic features were measured and compared to the same anthropomorphic feature measurements of one or more training subjects. The previously utilized systems and methods identified a training subject with the closest anthropomorphic feature measurements and personalized a set of HRTFs for the user based on the set of HRTFs for the identified training subject. As such, the previously utilized systems and method required explicitly extracting specific geometric and/or anthropometric features, such as head width, height, ear positions, etc. Without these measured features, the previously utilized systems and methods are unable to compare the head shape of user to a database of head shapes for training subjects utilizing non-parametric processing.

The systems and methods as disclosed herein are directed to HRTF personalization. The systems and methods for HRTF personalization as disclosed herein create a personalized set of HRTFs for a user utilizing non-parametric processing of a head shape of the user and/or training subjects. The systems and methods for HRTF personalization as disclosed herein apply a three-dimensional (3D) transform to a 3D scan of a head of a user and to the 3D scans of the heads of the training subject to identify a training subject with a most similar head shape and/or portion of the head shape to the user.

FIGS. 1A-1D illustrate different examples of a HRTF personalization system 100 being utilized by a user 102 via a client computing device 104, in accordance with aspects of the disclosure. The HRTF personalization system 100 creates a personalized set of HRTFs for the user 102 by comparing harmonic expansion of head scans.

Figure 1C:
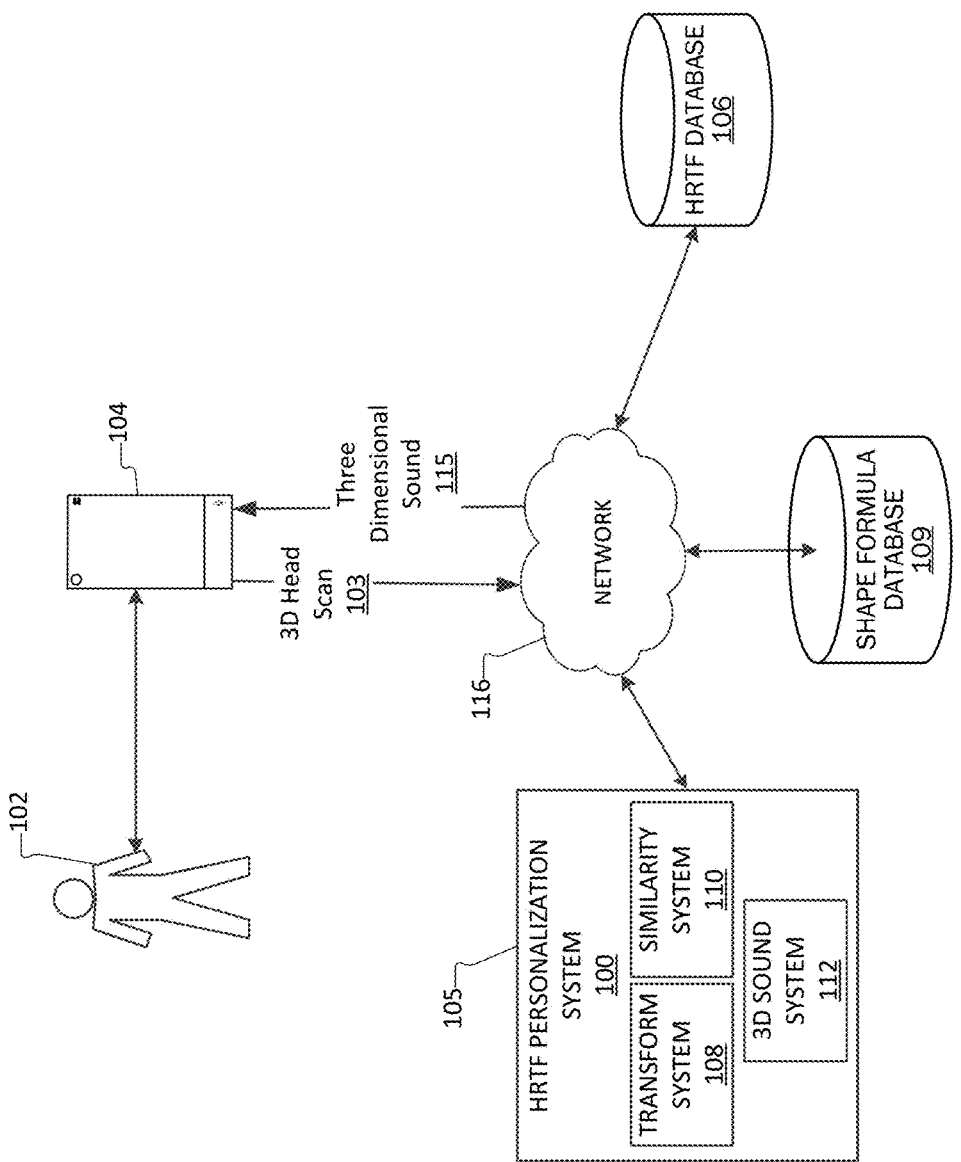
FIG. 1C is a schematic diagram illustrating a system for HRTF personalization being utilized by a user via a client computing device, in accordance with aspects of the disclosure.

The HRTF personalization system 100 may include a transform system 108, a similarity system 110, and/or a three-dimensional sound system 112, as illustrated in FIGS. 1A-1D. In some aspects, the HRTF personalization system 100 includes an HRTF database 106 and/or a mathematical formula shape database 109. In other aspects, the HRTF personalization system 100 communicates via a network 116 with a HRTF database 106 (as illustrated by FIGS. 1A-1D) and/or a mathematical formula shape database 109 (as illustrated by FIGS. 1B-1C) that is separate and distinct form the HRTF personalization system 100. In some aspects, the HRTF database 106 and/or the mathematical formula shape database 109 are one or more databases. As such, the transform system 108, the similarity system 110, the three-dimensional sound system 112, the HRTF database 106, and/or a mathematical formula shape database 109 may communicate between each other.

In some aspects, the HRTF personalization system 100 is implemented on the client computing device 104, as illustrated by FIGS. 1A-1B. In a basic configuration, the client computing device 104 is a computer having both input elements and output elements. The client computing device 104 may be any suitable computing device for implementing the HRTF personalization system 100. For example, the client computing device 104 may be a mobile telephone, a smart phone, a tablet, a phablet, a smart watch, a wearable computer, a personal computer, a gaming system, a desktop computer, a laptop computer, a holographic device, a virtual reality system, and/or etc. This list is exemplary only and should not be considered as limiting. Any suitable client computing device 104 for implementing the HRTF personalization system 100 may be utilized.

Figure 1D:
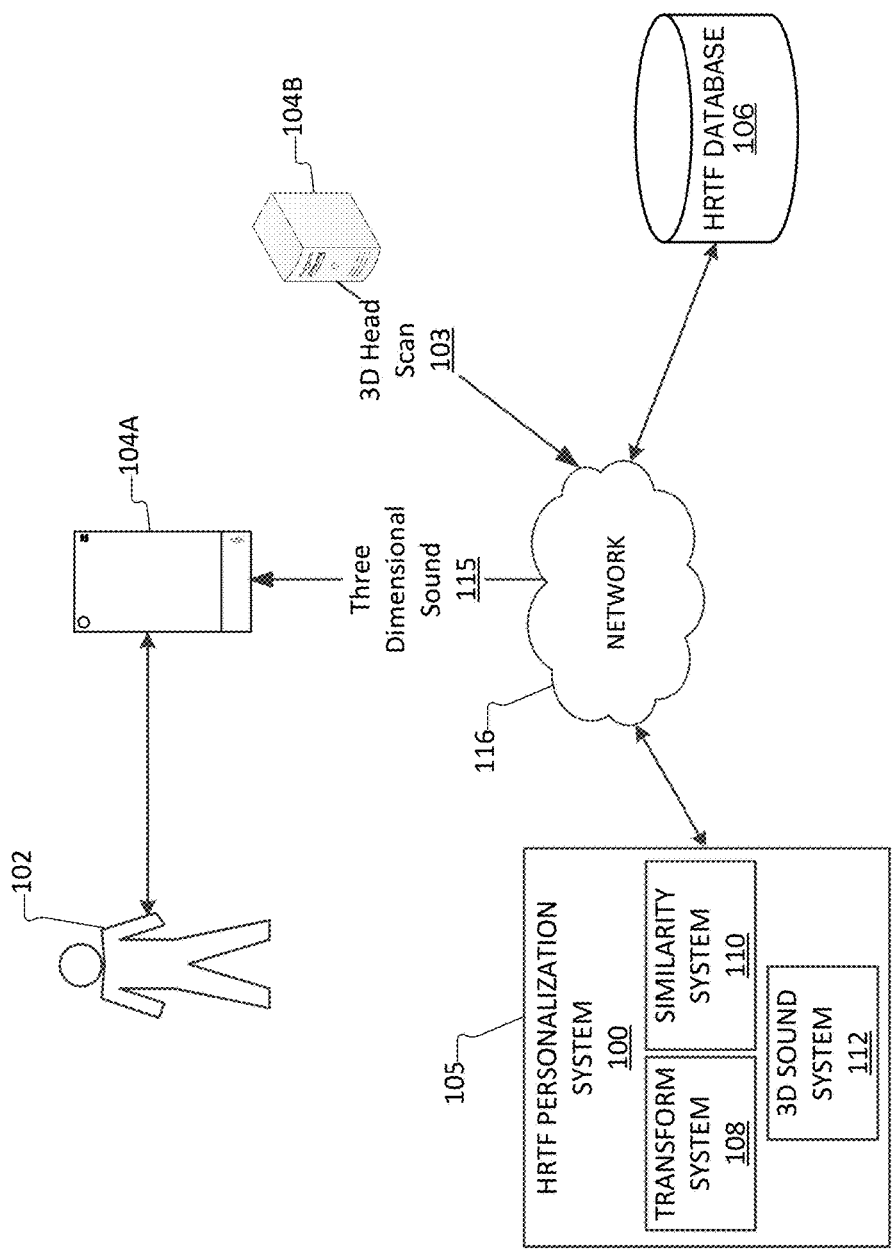
FIG. 1D is a schematic diagram illustrating a system for HRTF personalization being utilized by a user via a client computing device, in accordance with aspects of the disclosure.

In other aspects, the HRTF personalization system 100 is implemented on a server computing device 105, as illustrated in FIGS. 1C-1D. The server computing device 105 may provide data to and/or receive data from the client computing device 104 through a network 116. In some aspects, the network 116 is a distributed computing network, such as the Internet. In further aspects, the HRTF personalization system 100 is implemented on more than one server computing device 105, such as a plurality or network of server computing devices 105. For example, the transform system 108 may be located on the same server computing device 105 as the similarity system 110, as illustrated in FIGS. 1C-1D, or may be located on separate server computing devices 105. In some aspects, the HRTF personalization system 100 is a hybrid system with portions of the HRTF personalization system 100 on the client computing device 104 and with portions of the HRTF personalization system 100 on one or more server computing devices 105.

The HRTF personalization system 100 collects the one or more 3D head scans 103 of the user 102. The term "collect" as utilized herein refers to the active retrieval of information and/or to the passive receiving of information. The client computing device 104 may have a stored or saved 3D head scan 103 of a user 102. In some aspects, the 3D head scan 103 is a high resolution 3D head scan 103. The 3D head scan 103 my include portions of the user's face, cheeks, neck, pinnae, and/or shoulders. In some aspects, the user 102 is associated with a plurality of client computing devices 104. In these aspects, the 3D head scan 103 may be collected from a client computing device 104B that is separate and distinct from the client computing device 104A that utilizes the HRTF personalization system 100 and/or receives 3D sound from the HRTF personalization system 100 as illustrated in FIGS. 1B and 1D. In other aspects, the HRTF personalization system 100 collects one or more 3D head scans 103 of the user 102 by taking a 3D head scan of the user 102.

The transform system 108 of the HRTF personalization system 100 collects the 3D head scan 103 of the user 102. The transform system 108 applies a 3D transform to the 3D head scan 103 of the user 102 to form a user transform. An example of how a 3D transform can be applied to a 3D head scan of the user 102 is provided in EXAMPLE 4 below. The transform is a harmonic expansion of a 3D head scan. The harmonic expansion of the 3D head scan 103 is a nonparametric processing of the geometry of the 3D head scan 103. In other words, the transform does not extract specific geometric and/or anthropometric features of the 3D head scan 103 and instead may calculate a shape of a 3D head scan 103 by utilizing mathematical formulas from a shape database 109, as illustrated in FIGS. 1B-1C. In some aspects, the 3D transform is a spherical harmonic transform. An example of spherical harmonic transform is provided below in EXAMPLE 1. In some aspects, the 3D transform is a spherical Fourier-Bessel transform (SFBT) and/or a spherical harmonic oscillator transform (SHOT). An example of the SFBT and SHOT suitable for system 100 is also provided below in EXAMPLE 1.

In some aspects, the transform system 108 also collects a set of training subject transforms. The transform system 108 may collect the set of training subject transforms from the HRTF database 106. In other aspects, the transform system 108 collects a set of 3D training subject head scans 103. The transform system 108 may collect the set of training subject 3D head scans 103 from the HRTF database 106. In these aspects, the transform system 108 applies a 3D transform to each training subject 3D head scan in the set of training subject 3D head scans 103 to form the set of training subject transforms.

The similarity system 110 of the HRTF personalization system 100 collects the user transform and the set of training subject transforms. The similarity system 110 compares the user transform to each transform in the set of training subject transforms. Next, the similarity system 110 identifies a training subject transform in the set of training subject transforms that is the most similar to the user transform. In some aspects, the similarity system 110 determines or calculates a distance matrix between the user transform and the set of training subject transforms. In these aspects, the similarity system 110 may select a training subject transform that is the most similar to the user transform based on the lowest or shortest distance in the distance matrix. EXAMPLES 2 and 4 below provide an example of how the most similar training subject transform to the user transform may be selected.

A measured set of HTRFs is known for each training subject. The set of HRTFs for each training subject may include one or more HRTF phases, from which ITDs and/or HRTF magnitudes are derived for each training subject. The similarity system 110 collects the set of HRTFs for the training subject (or closest training subject) with the most similar transform to the user transform. In some aspects, the similarity system 110 collects the set of HRTFs for the training subject with the most similar transform to the user transform from the HRTF database 106. In other aspects, the similarity system 110 collects the set of HRTFs for the training subject with the most similar transform to the user transform from local storage on the HRTF personalization system 100. In some aspects, the similarity system 110 utilizes the set of HRTFs for the training subject with the most similar transform to the user transform as the personalized set of HRTFS for the user 102. In further aspects, the similarity system 110 utilizes one or more ITDs from the set of HRTFs for the training subject with the most similar transform to the user transform to personalize a set of HRTFS for the user 102. In other aspects, the similarity system 110 utilizes one or more HRTF magnitudes from the set of HRTFs for the training subject with the most similar transform to the user transform to personalize a set of HRTFS for the user 102.

The HRTF personalization system 100 may also include a three-dimensional (3D) sound system 112. The 3D sound system 112 of the HRTF personalization system 100 collects the personalized set of HRTFs for the user 102. The 3D sound system 112 generates an HRTF-modified audio signal (also referred to herein as a 3D sound) for the user 102 based on the personalized set of HRTFs for the user 102. The 3D sound system 112 may then provide the 3D sound to the user 102. In some aspects, the 3D sound system 112 sends the 3D sound to a client computing device 104 to provide the sound to the user 102 via one or more speakers. In other aspects, the 3D sound system 112 provides the 3D sound to the user 102 via one or more speakers located on any suitable device for providing sound to the user 102, such as the client computing device 104, head phones, ear buds, wireless speaker, etc.

While the description of system 100 focuses on a comparison of a transform of the 3D head shape of the user 102 to a transform of 3D head shape of the training subjects, system 100 could be performed based on just a portion of the 3D head shape of the user 102 and training subjects, such as the pinnae. In further aspects, the system 100 may compare both a transform of the 3D head shape of the user 102 to a transform of 3D head shape of the training subjects and a transform of a portion of the 3D head shape of the user 102, such as the pinnae, to a transform of a portion of the 3D head shape of the training subjects to select the training subject that is the most similar to the user by system 100. The pinnae shape may be utilized by system 100 because the pinna shape affects the fine structure of HRTF magnitudes above frequencies of about 4 kHz.

Experimental results show that the HRTF personalization system 100 performs comparably to, and in some instances, better than previously utilized HRTF personalization systems that utilized averaged ITDs from the HRTFs of training subjects in a database or a generic set of HRTFs. As such, the HRTF personalization system 100 provides an effective system for indirect personalization of HRTFs for a given user 102.

Figure 4:
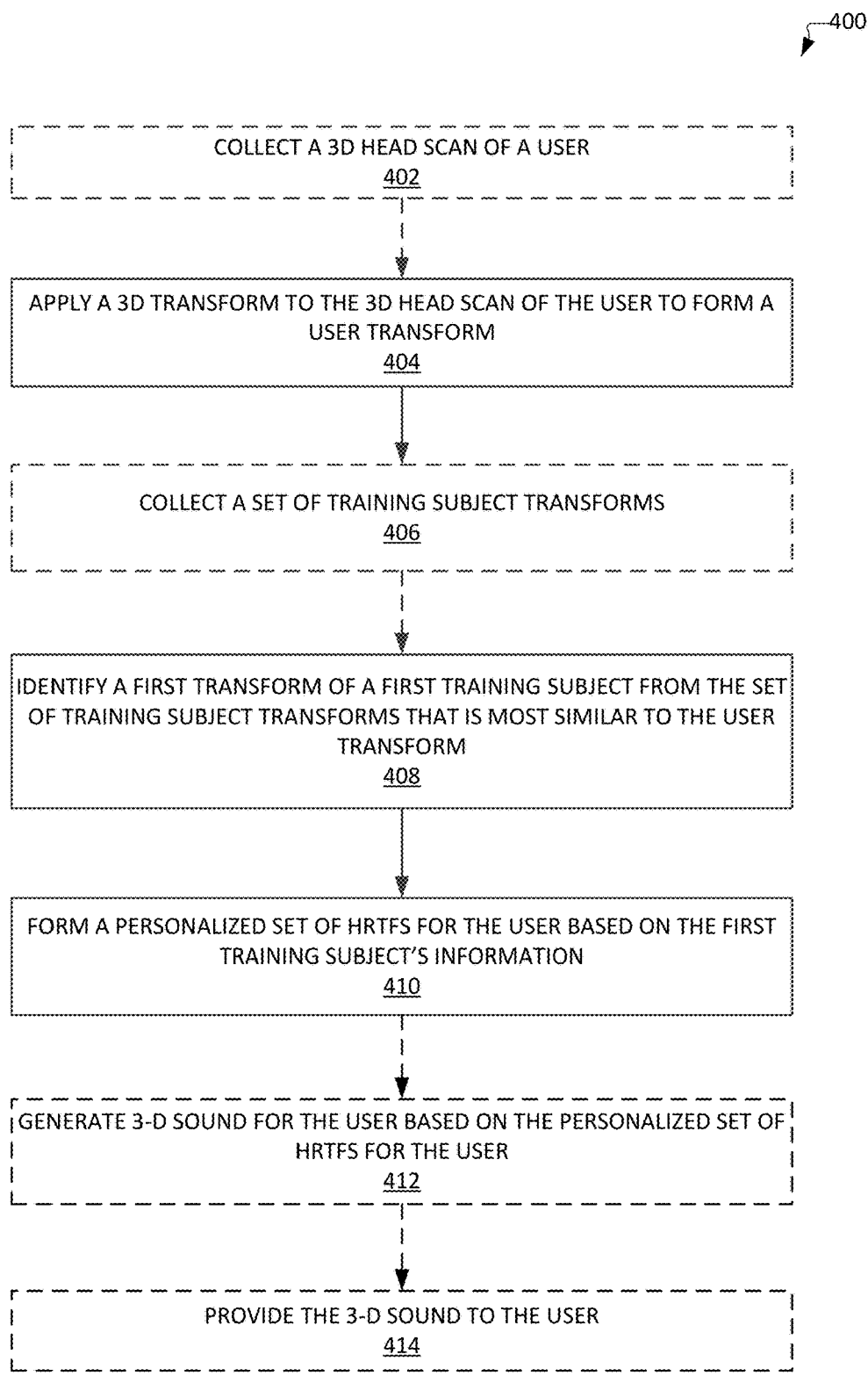
FIG. 4 is block flow diagram illustrating a method for HRTF personalization, in accordance with aspects of the disclosure.

FIG. 4 illustrates a flow diagram conceptually illustrating an example of a method 400 for personalizing HRTFs. Method 400 generates or selects a personalized HRTF for the user 102 utilizing non-parametric processing of 3D head scans for a user and/or training subjects.

In some aspects, method 400 includes operations 402. In other aspects, method 400 does not include operation 402. As such, in some aspects, method 400 starts at operation 402 or 404.

At optional operation 402, a three-dimensional (3D) head scan of the user is collected. In some aspects, the 3D head scan of the user is collected from storage on a client computing device and/or server computing device. In other aspects, the 3D head scan of the user is collected by taking a 3D head scan of the user. In other aspects, the 3D head scan of the user is not collected because method 400 already has the 3D head scan of the user. The head of the user may include the user's face, neck, ears, pinnae, and/or any regions in between.

At operation 404, a 3D transform is applied to the 3D head scan and/or a portion of the head scan of the user to form a user transform. In some aspects, the 3D transform is a SFBT and/or SHOT. In either case, the transform is a non-parametric processing of the 3D head scan. In some aspects, the transform is a harmonic expansion of the 3D head scan. For example, the transform may utilize a mathematical formula shape database for harmonic expansion of the three-dimensional scan of the head of the user.

In some aspects, method 400 also includes operation 406. At optional operation 406, a set of training subject transforms are collected. In some aspect, the set of training subject transforms are collected at operation 406 by applying the 3D transform to a set of 3D head scans and/or a portion of the 3D head scans of the training subjects. In further aspects, the set of 3D head scans and/or a portion of the 3D head scans of the training subjects are already known by method 400 or collected by method 400 from a HRTF database at operation 406. In other aspects, a set of training subject transforms are collected at operation 406 by collecting the set of training subject transforms from an HRTF database. In further aspects, the set of training subject transforms are collected at operation 406 by collecting the set of training subject transforms from storage on a client or server computing device. Each training subject is associated with a personalized set of HRTFs.

At operation 408, the user transform is compared to the set of training subject transforms. Based on the comparison, one or more transforms of a training subject is identified from the set of training subject transforms that is most similar to the user transform at operation 408. In some aspects at operation 408, a distance matrix is determined between the user transform and the set of training subject transforms. In these aspects, the most similar training subject transform(s) may be selected based on the shortest distance in the distance matrix.

Next, at operation 410, a personalized set of HRTFs for the user is generated based on the set of HRTFs of the training subject with the most similar transform(s). In some aspects, operation 410 is performed in response to identifying the training subject with the closest one or more transforms to the user transform. In some aspects at operation 410, the one or more ITDs from the set of HRTFs of the training subject with the closest one or more transforms are utilized to personalize a set of HRTFs for the user. In other aspects at operation 410, the set of HRTFs of the training subject with the closest one or more transforms is utilized as the personalized set of HRTFs for the user. In further aspects at operation 410, one or more magnitudes from the set of HRTFs of the training subject with the closest one or more transforms are utilized to personalize a set of HRTFs for the user. In further aspects, the personalized set of HRTFs for the training subject with most similar one or more transforms is collected at operation 410. In other aspects, the personalized set of HRTFs for the training subject with most similar one or more transforms was collected at operation 410 with a set of training subject transforms at operation 406.

In some aspects, method 400 includes operations 412 and/or 414. In other aspects, method 400 does not include operations 412 and/or 414. At optional operation 412, an HRTF-modified audio signal (or 3D sound) for the user is generated based on the personalized set of HRTFs for the user or instructions are sent to a client computing device for generating the HRTF-modified audio signal. At optional operation 414, the HRTF-modified audio signal generated at operation 412 is provided to the user or instructions are generated and sent to a client computing device to provide the HRTF-modified audio signal to the user. In some aspects, the HRTF-modified audio signal is provided to the user via one or more speakers associated with the client computing device. In further aspects, the one or more speakers may be part of any suitable device, such as a client computing device, headphones, portable speaker, ear buds, etc.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
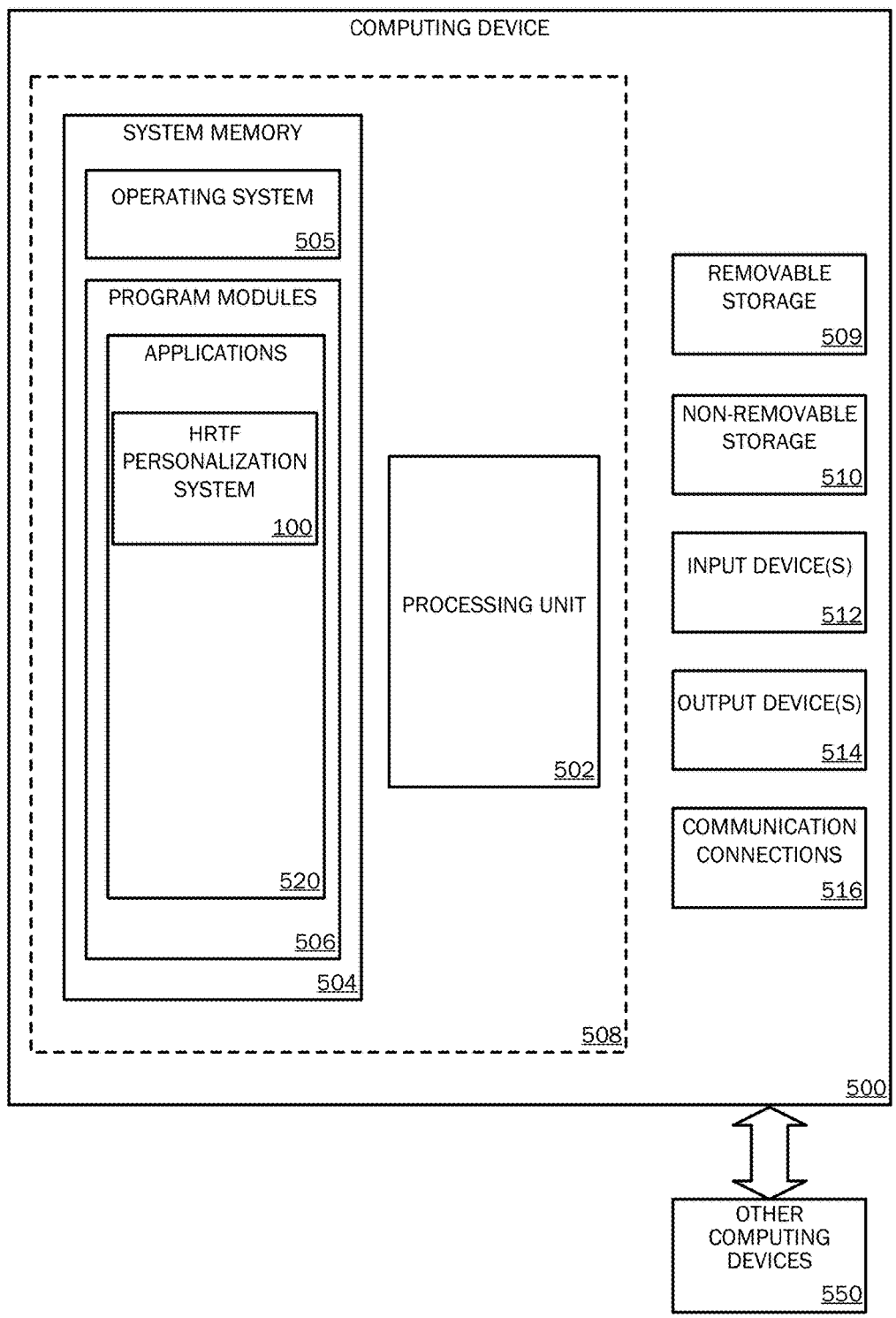
FIG. 5 is a block diagram illustrating example physical components of a computing device with which various aspects of the disclosure may be practiced.

FIG. 5 is a block diagram illustrating physical components (e.g., hardware) of a computing device 500 with which aspects of the disclosure may be practiced. For example, the HRTF personalization system 100 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the HRTF personalization system 100 that can be executed to employ method 400 as disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combined of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., HRTF personalization system 100) may perform processes including, but not limited to, performing method 400 as described herein. For example, the processing unit 502 may implement the HRTF personalization system 100. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip).

Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
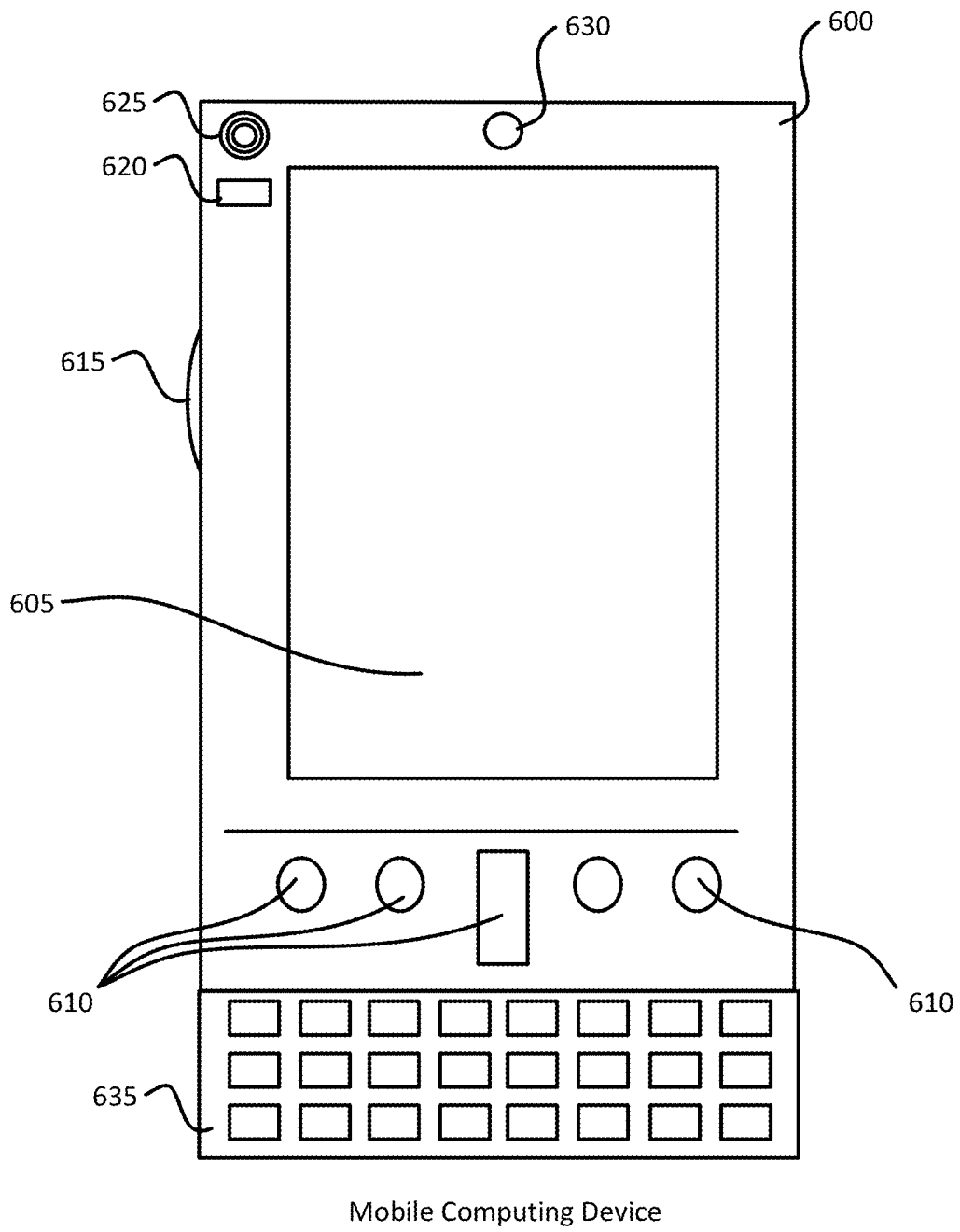
FIG. 6A is a simplified block diagram of a mobile computing device with which various aspects of the disclosure may be practiced.
Figure 6B:
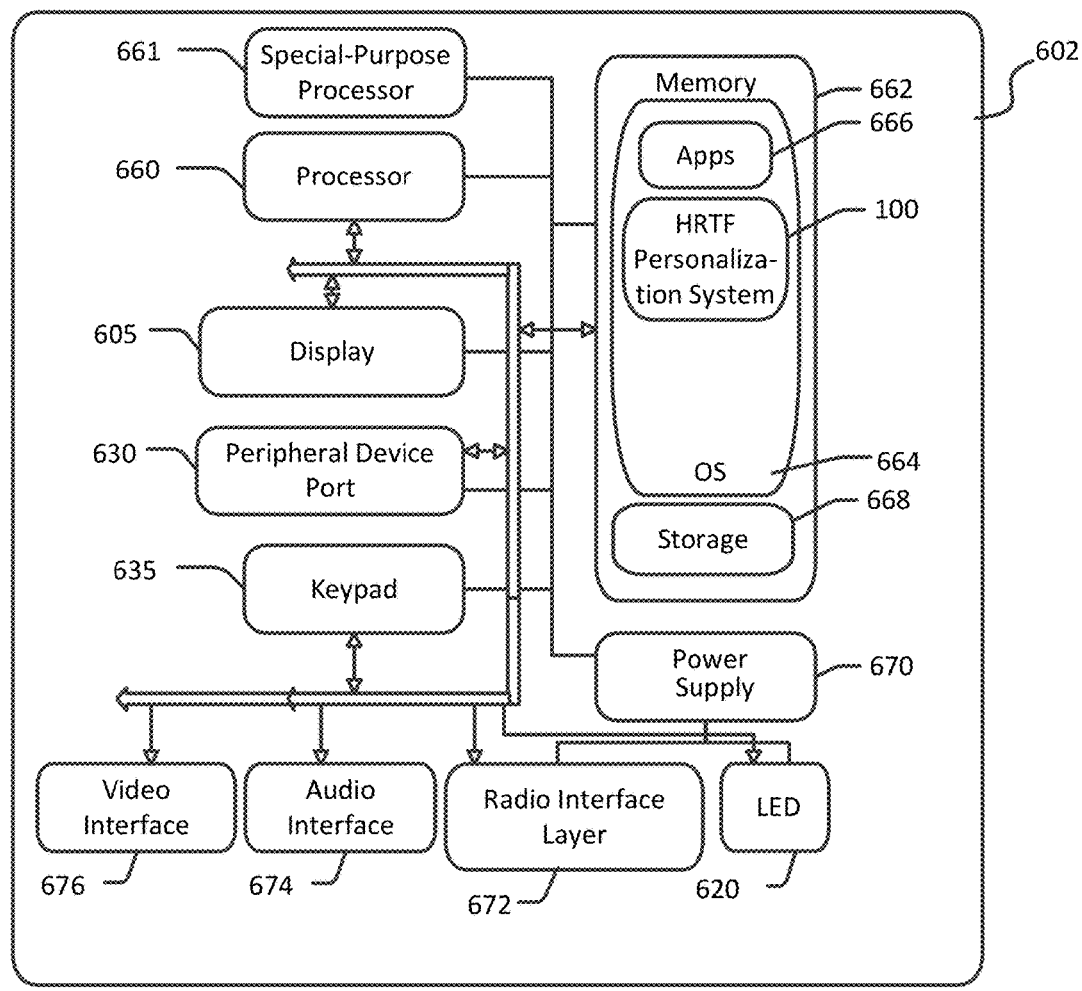
FIG. 6B is a simplified block diagram of the mobile computing device shown in FIG. 6A with which various aspects of the disclosure may be practiced.

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 6A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 and/or the HRTF personalization system 100 run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
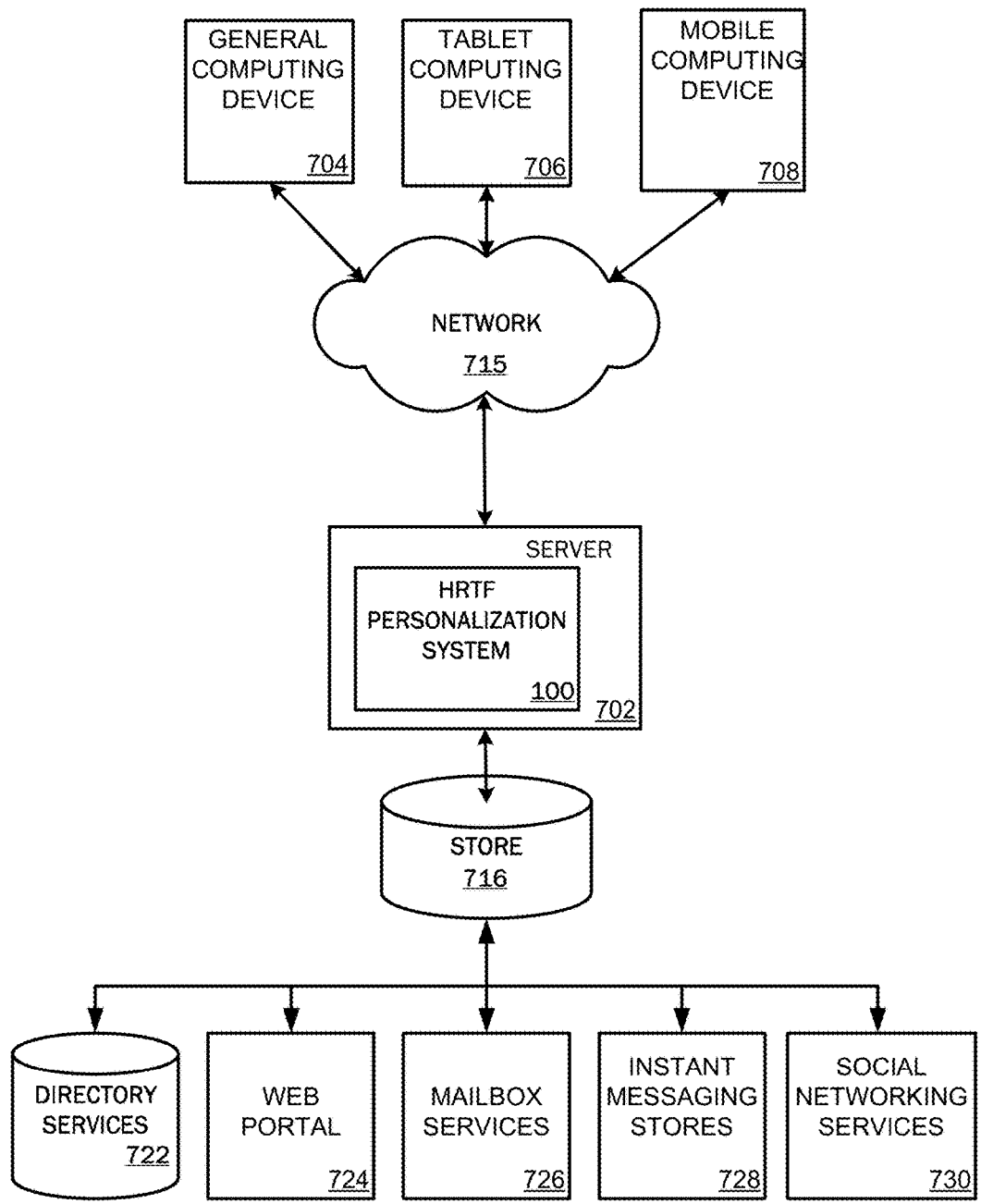
FIG. 7 is a simplified block diagram of a distributed computing system in which various aspects of the disclosure may be practiced.

FIG. 7 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types. For example, various documents may be stored using a directory service 722, a web portal 724, a mailbox service 726, an instant messaging store 728, and/or a social networking site 730. By way of example, the HRTF personalization system 100 may be implemented in a general computing device 704, a tablet computing device 706 and/or a mobile computing device 708 (e.g., a smart phone). In some aspects, the server 702 is configured to implement a HRTF personalization system 100, via the network 715 as illustrated in FIG. 7.

Figure 8:
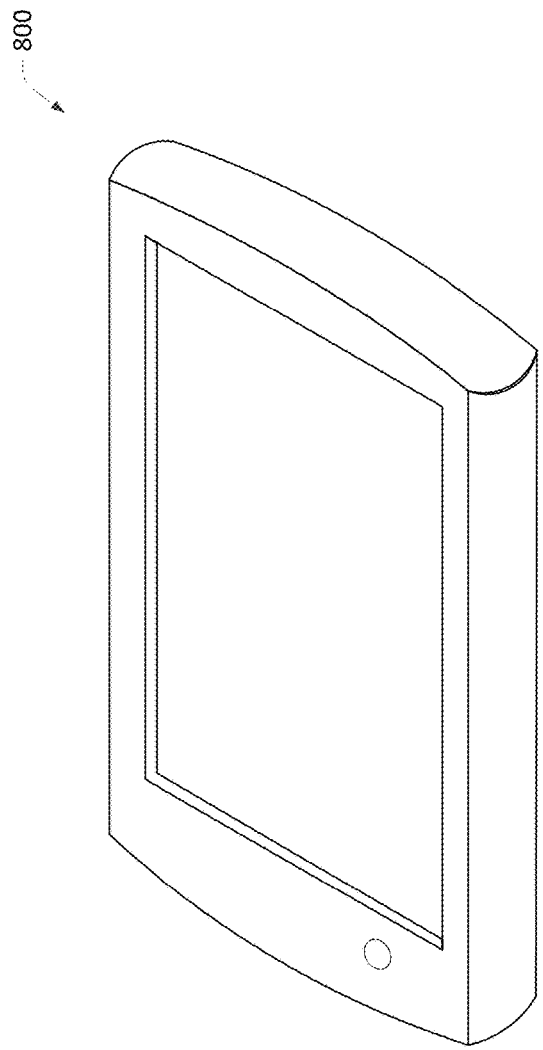
FIG. 8 illustrates a tablet computing device with which various aspects of the disclosure may be practiced.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

EXAMPLES

Example 1

In this example, a spherical harmonic transform (SHT) is defined. The SHT is defined on the unit sphere of square integrable functions $S^2$ with harmonic coefficients given by:

$$f_{lm} = \int_{\gamma \in S^2} f(\gamma) Y_{lm}^*(\gamma) d\gamma, \qquad \text{EQ \#1}$$

where $\gamma \equiv (\theta, \phi)$ is a point on $S^2$, where $(\theta, \phi)$ are the inclination and azimuth angle respectively, and where $\int_\gamma d_\gamma = \int_0^{2\pi} \int_0^\pi \sin\theta d\theta d\phi$. The basis functions $Y_{lm}(\gamma)$ are complex or real orthonormalized spherical harmonics (SHs) of degree l=0, ..., ∞ and order m=-l, ..., l. The function can be recovered from the coefficients by the inverse SHT as shown below:

$$f(\gamma) = \sum_{l=0}^{\infty} \sum_{m=-l}^{l} f_{lm} Y_{lm}(\gamma), \qquad \text{EQ \#2}$$

A general spherical 3D transform form can be defined as:

$$f_{nlm} = \int_{r \in R^3} f(r) \psi_{nlm}^*(r) d^3 r, \qquad \text{EQ \#3}$$

where $r \equiv (r, \theta, \phi)$ and $d^3 r = r^2 \sin\theta d\theta d\phi dr$ is the infinitesimal volume element in spherical coordinates. In this EXAMPLE, basis functions that are separable are needed. The basis function that is separable in the radial and angular dimensions as in:

$$\psi_{nlm}(r) = \psi_{nl}(r) \psi_{lm}(\gamma), \qquad \text{EQ \#4}$$

in which case the angular term are naturally the SHs $\psi_{lm}(\gamma) = Y_{lm}(\gamma)$. Due to EQ #4, the transform of EQ #3 can be split into a radial transform with a nested SHT as shown below:

$$f_{nlm} = \int_{r \in R^3} [\int_\gamma f(r, \gamma) Y_{lm}^*(\gamma) d_\gamma] \psi_{nl}^*(r) r^2 dr = \int_r f_{lm}(r) \psi_{nl}^*(r) r^2 dr. \qquad \text{EQ \#5}$$

The function can be reconstructed by the inverse transform as:

$$f(r, \gamma) = \sum_{n, l \in \mathbb{Z}_+} \sum_{m=-l}^{l} f_{nlm} \psi_{nl}(r) Y_{lm}(\gamma), \qquad \text{EQ \#6}$$

where the indexing of the double summation over the (n, l) wavenumbers depend on the type of the radial transform. For all practical applications, the order of the transform is bandlimited to some maximum (N, L) depending on the order of the underlying function that is transformed, or on limitations imposed by finite sampling conditions.

Two spherical 3D transforms of the form of EQ #5 are examined in this EXAMPLE, differing only on the radial part of the basis function and their radial domain of integration. The first is the spherical Fourier-Bessel transform (SFBT), with the radial basis functions of:

$$\psi_{nlm}(r) = N_{nl} j_l(K_{nl} r), \qquad \text{EQ \#7}$$

being the spherical Bessel functions $j_l$ of order l, including the normalization of $N_{nl}$ that preserves orthonormality. If the domain of the SFBT is restricted to a solid sphere of radius $\alpha$ with $r \in [0, \alpha]$ and a boundary condition of $\psi_{nlm}(\alpha, \gamma) = 0$ then the normalization $N_{nl}$ and the scaling factor $k_{nl}$ are:

$$N_{nl} = \frac{\alpha^3}{2} j_{l+1}^2(x_{ln}), \qquad \text{EQ \#8}$$

and $k_{nl} = x_{ln}/\alpha$, where $x_{ln}$ is the $n^{th}$ positive root of $j_l(x) = 0$. Band-limiting the transform to maximum orders N, L requires all coefficients of n=1, N and l=0, ... L.

The second transform under study is the spherical harmonic oscillator transform (SHOT), familiar in quantum mechanics as SHOT's basis functions express the wave functions of the 3D isotropic quantum harmonic oscillator. SHOT is a signal processing tool for similar applications to the SFBT, such as compression and reconstruction of 3D data, shape registration and rotation estimation. The radial wave functions of the SHOT are given by:

$$\psi_{nl}(r) = N_{nl} L_n^{l+1/2}(r^2) r^l e^{-r^2/2}, \qquad \text{EQ \#9}$$

where $L_n^{l+1/2}$ are the associated Laguerre polynomials with $n \in \mathbb{Z}_+$. The normalization factor can be found by enforcing orthonormality on EQ #9 by $\int_0^\infty |\psi_{nl}(r)|^2 r^2 dr = 1$, and by the orthogonality relation of the Laguerre polynomials:

$$N_{nl} = \frac{2n!}{\Gamma(n+l+3/2)}, \qquad \text{EQ \#10}$$

where $\Gamma(\cdot)$ is the Gamma function. Even though the angular and radial orders n, l $\in \mathbb{Z}_+$ can be considered independent. This EXAMPLE follows the convention used in EQ #20 that expresses the order of the transform with a single quantum number p=2n+l. A band-limited transform is then defined up to order P, with p=0, ... P. Contrary to the SFBT defined above, the radial domain of the SHOT is $r \in [0, \infty)$.

Example 2

In this example, shape registration and detection is performed utilizing the transforms from EXAMPLE 1. It has been shown that the energy of the SHT spectrum per angular order l forms a rotationally-invariant descriptor of the transformed shape, suitable for registration and similarity matching of 3D objects. That approach relies on sampling spherically a 3D object by a) voxelizing the boundary of the object, b) finding the intersecting points between these voxels and K concentric spheres expanding from the origin, and c) applying the SHT on each spherical intersection individually up to some order L. Harmonic coefficients $f_{lm}^{(k)}$ are then obtained with k=1, ... K. A rotationally-invariant descriptor for each sphere is given by:

$$e_l^{(k)} = \sqrt{\sum_{m=-l}^{l}|f_{lm}^{(k)}|^2}, \qquad \text{EQ \#11}$$

resulting in an (L+1)×K matrix E that characterizes the specific shape and is robust to it being rotated. A shape distance measure between two shapes (i, j) is further defined as:

$$d_{ij}^{SHT} = \|E_i - E_j\|_2. \qquad \text{EQ \#12}$$

This approach treats each intersecting sphere separately, meaning that intersections at each segment can be rotated arbitrarily with no effect to the feature matrix E. As such, the SFBT is used instead of separate radial SHTs, obtaining a 3D spectrum unique to the shape under study. Then a rotationally-invariant descriptor can be formulated similar to EQ #11 for the SFBT spectrum, as $$e_{nl} = \sqrt{\sum_{m=-l}^{l}|f_{nlm}|^2}, \qquad \text{EQ \#13}$$

and similarly for the SHOT spectrum. In this EXAMPLE, a 3D shape similarity measure was constructed based on the SFBT/SHOT descriptor of EQUATION#13, by stacking the spectral energies $e_{nl}$ in a vector e. The rotationally-invariant distance measure between two shapes (i, j) is then given by:

$$d_{ij}^{S3DT} = \|e_i - e_j\|_2. \qquad \text{EQ \#14}$$

Example 3

In this example, the 3D transforms from EXAMPLE 1 and EXAMPLE 2 were applied to a database of 144 high resolution head scans of training subjects captured with a Flexscan3D optical scanning setup to form a set of training subject transforms. Each head scan is associated with a set of measured HRTFs for the training subject of that head scan. The set of measured HRTFs for each training subject in the database was captured in the anechoic chamber of Microsoft® Research at 400 measurement directions. The 3D transforms from EXAMPLES 1 and 2 were also applied to a high resolution 3D scan of a user. The most similar head in the database to the user's head was selected based on the distance metric of EQUATION #14 from EXAMPLE 2 by utilizing the user's head transform and each transform in the set of training subject transforms.

Example 4

Figure 2C:
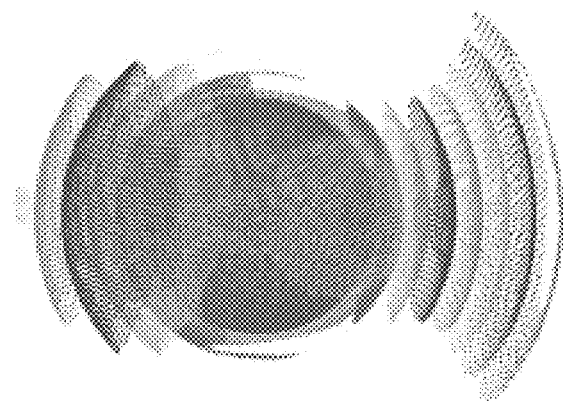
FIGS. 2A-2C are images illustrating a sampling process for applying the three-dimensional transform to a three-dimensional head scan, in accordance with aspects of the disclosure.
Figure 2B:
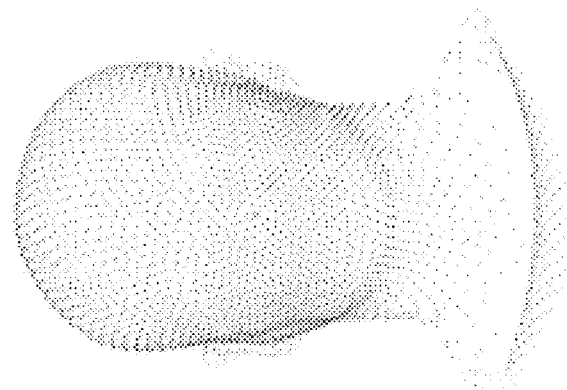
Figure 2A:
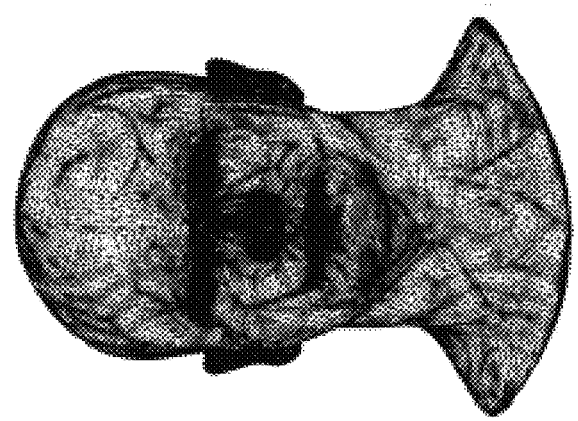

In this example, application of the 3D transforms in EXAMPLE 1 and EXAMPLE 2 to a 3D head scan is described. For the application of the SHOT and SFBT to the head scans, a sampling approach was used, but instead of voxelizing the scans, spherical sampling in a uniformly distributed set of directions was performed. 5000 uniform directions were generated as a minimum energy solution to the Thompson problem. The step size for the radial sampling was fixed to 1 mm, in order to capture variations on the head shape with high detail. A maximum radius of 165 mm, corresponding to the furthest point of all head scans in the database, was used to limit the radial dimension. The head scan was considered as a solid object and all samples in the interior of the mesh were set to a value of one, with the rest set to zero. To assess this interior/exterior condition, a ray tracer was used to find the intersections of each sampling direction with the mesh and, based on these, determine if the samples across the ray were inside or outside the head boundary. An example of the sampling process is shown in FIGS. 2A-2C. FIG. 2A is an image illustrating the original scanned meshed, in accordance with aspects of the disclosure. FIG. 2B is an image illustrating the ray tracing intersections, in accordance with aspects of the disclosure. FIG. 2C is an image illustrating a coarsely sampled example, with a few sampling spheres for visibility, in accordance with aspects of the disclosure.

Figures 3A, 3B:
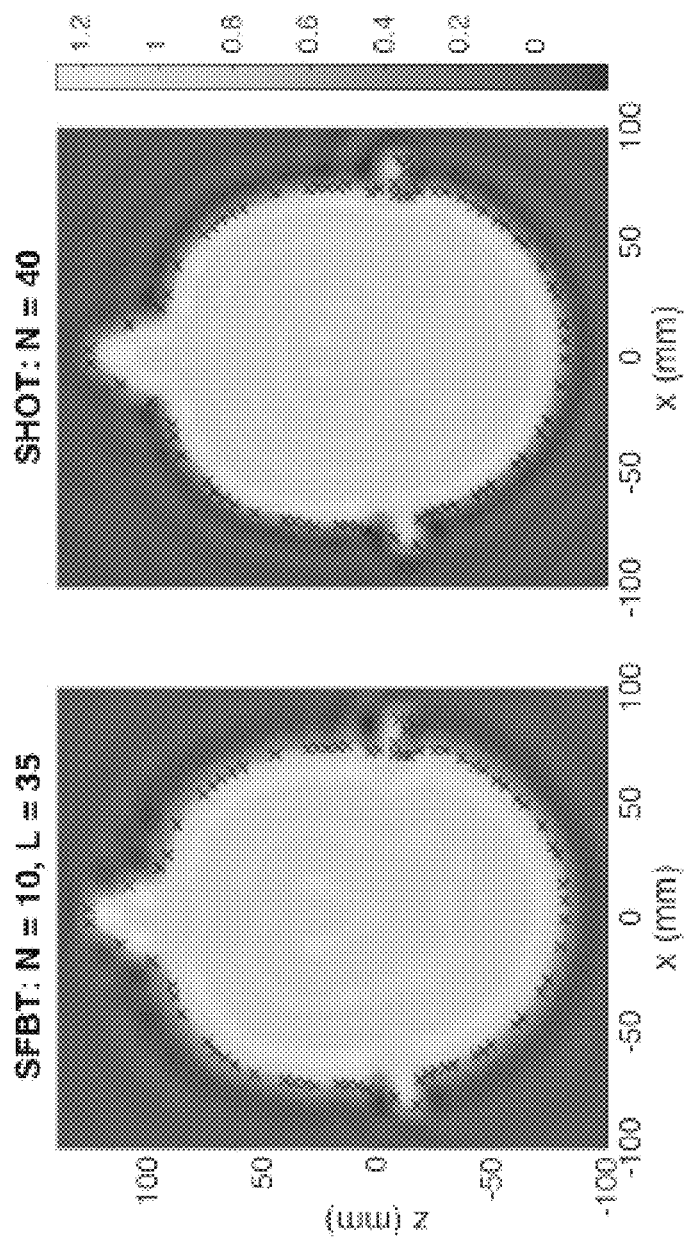
FIG. 3A is an image illustrating a head shape reconstruction of a horizontal plane passing through the interaural axis for a spherical Fourier-Bessel transform, in accordance with aspects of the disclosure.
FIG. 3B is an image illustrating a head shape reconstruction of a horizontal plane passing through the interaural axis for a spherical harmonic oscillator transform, in accordance with aspects of the disclosure.

Due to the uniformity of the sampling directions, the discrete SHT in EQUATION #5 on each radial step $r_j$ is reduced to:

$$f_{lm}(r_j) = \int_\gamma f(r_j, \gamma) Y_{lm}^*(\gamma) d\gamma = \frac{4\pi}{K} \sum_{k=1}^{K} f(r_j, \gamma_k) Y_{lm}^*(\gamma_k), \qquad \text{EQ \#15}$$

with $\gamma_k$ as the discrete sampling directions. To obtain the full 3D harmonic coefficients $f_{nlm}$, the discrete radial transform of EQUATION #5 was applied to $f_{lm}(r_j)$ with the respective wave functions $\psi_{nl}(r_j)$ using trapezoidal integration. The order of the transform was limited to N=10, L=35 for the SFBT, and P=40 for the SHOT. FIGS. 3A and 3B are images illustrating a visual validation of the transforms, where reconstruction by the inverse SFBT and SHOT manages to represent the head shape accurately, in accordance with aspects of the disclosure. FIG. 3A is an image illustrating a visual validation of the transforms, where reconstruction by the inverse SFBT manages to represent the head shape accurately, in accordance with aspects of the disclosure. FIG. 3B is an image illustrating a visual validation of the transforms, where reconstruction by the inverse SHOT manages to represent the head shape accurately, in accordance with aspects of the disclosure. The dots illustrated in FIGS. 3A and 3B represent actual intersection points on the boundary of the mesh returned by the ray tracer.

After the SFBT and SHOT spectra were obtained, a distance matrix between all head scans was determined by EQUATION #13 and EQUATION #14, and for each user. A most similar head scan was selected from the database of training subjects based on the most similar transform selected from the set of training subject transforms. The ITD corresponding to the selected head scan of training subject was deemed as the non-individual personalized ITD for that user.

Example 5

In this example, a personalized set of HRTFs was determined from a user based on the above EXAMPLES. The ITD of each subject in the database discussed above in EXAMPLE 4 was extracted from the HRTFs. To define an ITD similarity measure that considered the ITDs across all directions, an approach similar to the head similarity criterion is followed. The ITD similarity measure is used to evaluate the performance of the proposed ITD/HRTF personalization method. A SHT of the ITD was taken, with a maximum order L=15, limited by the specific measurement grid. Since the measurement grid was not uniform, EQUATION 15 could not be applied directly, a weighted least-squares solution to the SHT was used as shown below:

$$b^{ITD} = (Y_L^H W Y_L)^{-1} Y_L^H W a^{ITD}, \qquad \text{EQ \#16}$$

where $a^{ITD}$ is the vector of the ITDs at the measurement directions, $Y_L$ is the matrix of SH values at the same directions up to order L, and W is a diagonal matrix of weights corresponding to the areas of the Voronoi cells around each measurement point on the sphere. Finally, after the SH spectrum of the ITDs $b^{ITD}$ was obtained, the rotationally-invariant descriptor $e^{ITD}$ of the SH spectrum was computed from EQUATION #11. This step was applied in order to determine an ITD similarity that is taking the ITD shape into account but not its rotation, which could vary between subjects during measurement. Finally, the ITD distance metric between subjects (i, j) was defined as:

$$d^{ITD} = \|e_i^{ITD} - e_j^{ITD}\|_2. \qquad \text{EQ \#17}$$

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some aspects of the present technology with reference to the accompanying drawings, in which only some of the possible aspects were described. Other aspects can, however, be embodied in many different forms and the specific aspects disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various aspects disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A system for head-related transfer function (HRTF) personalization, the system comprising:
   at least one processor; and
   a memory for storing and encoding computer executable instructions that, when executed by the at least one processor is operative to:
   apply a three-dimensional transform to a three-dimensional scan of a head of a user by utilizing a first set of mathematical formulas retrieved from a shape database for generating a harmonic expansion of the three-dimensional scan of the head of the user to form a user transform;
   compare the harmonic expansion of the user transform to harmonic expansions for a set of training subject transforms, wherein the training subject transforms are formed by utilizing a second set of mathematical formulas retrieved from the shape database for generating harmonic expansions of three-dimensional scans of heads of training subjects;
   identify a closest harmonic expansion of a closest training subject from the set of training subject transforms that is most similar to the harmonic expansion of the user transform based on the comparison;
   in response to identifying the closest harmonic expansion, utilizing one or more interaural time delays of the closest training subject to generate a personalized set of HRTFs for the user; and
   generate an HRTF-modified audio signal based on the personalized set of HRTFs for the user.

2. The system of claim 1, wherein the three-dimensional transform is at least one of a spherical Fourier-Bessel transform or a spherical harmonic oscillator transform.

3. The system of claim 1, wherein the at least one processor is further operative to:
   apply the three-dimensional transform to a set of three-dimensional head scans of training subjects to form the set of training subject transforms.

4. The system of claim 3, wherein the three-dimensional transform is at least one of a spherical Fourier-Bessel transform or a spherical harmonic oscillator transform.

5. The system of claim 1, wherein the at least one processor is further operative to:
   provide the HRTF-modified audio signal to the user, wherein the HRTF-modified audio signal is provided to the user via one or more speakers.

6. The system of claim 5, wherein the one or more speakers are head phones or ear buds.

7. The system of claim 1, wherein the at least one processor is further operative to:
   collect the set of training subject transforms,
   wherein each training subject transform in the set of training subject transforms is associated with a three-dimensional head scan of a training subject and a set of HRTFs for the training subject.

8. The system of claim 1, wherein identifying the closest transform of the closest training subject from the set of training subject transforms that is most similar to the user transform comprises:
   calculate a distance matrix between the user transform and each transform in the set of training subject transforms; and
   determine that the closest transform of the closest training subject has a shortest distant based on the distance matrix.

9. The system of claim 1, wherein the at least one processor is further operative to:
   collect the three-dimensional scan of the head of the user.

10. A method for head related transfer function (HRTF) personalization, the method comprising:
    collecting a three-dimensional scan of a head of a user;
    applying a three-dimensional transform to the three-dimensional scan of the head of the user by utilizing a first set of mathematical formulas from a shape database for generating a harmonic expansion of the three-dimensional scan of the head of the user to form a user transform;
    comparing the harmonic expansion of the user transform to harmonic expansions for a set of training subject transforms, wherein the training subject transforms are formed by utilizing a second set of mathematical formulas from the shape database for generating harmonic expansions of three-dimensional scans of heads of training subjects;
    identifying a closest harmonic expansion of a closest training subject from the set of training subject transforms that is most similar to the harmonic transform of the user transform based on the comparing;
    in response to the identifying of the closest harmonic expansion, utilizing HRTF magnitudes or interaural time delays of the closest training subject to generate a personalized set of HRTFs for the user; and generating an HRTF-modified audio signal based on the personalized set of HRTFs for the user.

11. The method of claim 10, wherein the three-dimensional transform is a spherical Fourier-Bessel transform.

12. The method of claim 10, further comprising:
applying the three-dimensional transform to a set of three-dimensional head scans of training subjects to form the set of training subject transforms.

13. The method of claim 10, further comprising:
providing the HRTF-modified audio signal to the user, wherein the 3-dimensional sound is provided to the user via one or more speakers.

14. The method of claim 10, further comprising:
collecting the set of training subject transforms.

15. The method of claim 10, wherein the scan of the head includes a face and pinnae of the user.

16. The method of claim 10, wherein the three-dimensional transform is a spherical harmonic oscillator transform.

17. A system for head-related transfer function (HRTF) personalization, the system comprising:
at least one processor; and
a memory for storing and encoding computer executable instructions that, when executed by the at least one processor is operative to:
apply a three-dimensional transform to a three-dimensional scan of a head of a user by utilizing a first set of mathematical formulas from a shape database for harmonic expansion of the three-dimensional scan of the head of the user to form a user transform;
identify a closest transform of a training subject from a set of training subject transforms that is most similar to the user transform, wherein the training subject transforms are formed by utilizing a second set of mathematical formulas from the shape database for harmonic expansion of three-dimensional scans of heads of training subjects; and
in response to identifying the closest transform, creating a set of a personalized set of HRTFs for the user based on the set of HRTFs of the for the training subject associated with the closest transform.

18. The system of claim 17, wherein the at least one processor is further operative to:
collect the three-dimensional scan of the head of the user.

19. The system of claim 17, wherein the at least one processor is further operative to:
generate an HRTF-modified audio signal based on the personalized set of HRTFs for the user; and
provide the HRTF-modified audio signal to the user.

20. The system of claim 1, wherein in response to identifying the closest harmonic expansion, further utilizing one or more HRTF magnitudes of the closest training subject to generate the personalized set of HRTFs for the user.

* * * * *